(12) United States Patent
Nishio et al.

(10) Patent No.: US 11,505,040 B2
(45) Date of Patent: Nov. 22, 2022

(54) VEHICLE

(71) Applicant: PANASONIC INTELLECTUAL PROPERTY MANAGEMENT CO., LTD., Osaka (JP)

(72) Inventors: Tsuyoshi Nishio, Chiba (JP); Takuma Masuda, Kanagawa (JP); Motohiro Aoki, Hyogo (JP); Yuhei Yamamoto, Tokyo (JP); Naoki Usui, Kanagawa (JP); Satoshi Tanigawa, Tokyo (JP); Takayuki Moriwaki, Kanagawa (JP); Takeshi Kiritoshi, Osaka (JP); Kazuhiko Kaneuchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 285 days.

(21) Appl. No.: 16/919,939

(22) Filed: Jul. 2, 2020

(65) Prior Publication Data
US 2020/0331327 A1   Oct. 22, 2020

Related U.S. Application Data

(63) Continuation of application No. PCT/JP2018/046886, filed on Dec. 19, 2018.

(30) Foreign Application Priority Data

Jan. 5, 2018 (JP) .............................. JP2018-000533
Oct. 2, 2018 (JP) .............................. JP2018-187657
(Continued)

(51) Int. Cl.
*B60J 3/02* (2006.01)
*B60N 2/14* (2006.01)
(Continued)

(52) U.S. Cl.
CPC ................ *B60J 3/02* (2013.01); *B60N 2/143* (2013.01); *B60N 3/00* (2013.01); *B60R 11/0235* (2013.01)

(58) Field of Classification Search
CPC . B60J 3/02; B60J 3/0204; B60J 3/0234; B60J 3/0243; B60R 11/0235; B60R 1/20;
(Continued)

(56) References Cited

U.S. PATENT DOCUMENTS 5,040,839 A * 8/1991 Moore .................. B60J 3/0204
296/97.4
6,367,857 B2  4/2002 Kifer et al.
(Continued)

FOREIGN PATENT DOCUMENTS

DE   102016226037   6/2018
JP   2002-337619    11/2002
(Continued)

OTHER PUBLICATIONS

Japan Office Action issued in Japan Patent Application No. 2018-187657, dated May 31, 2022, together with English translation thereof.
(Continued)

*Primary Examiner* — Gregory A Blankenship
(74) *Attorney, Agent, or Firm* — Greenblum & Bernstein, P.L.C.

(57) ABSTRACT

A vehicle includes: a vehicle body including a vehicle cabin; at least one wheel disposed along one direction in the vehicle body; a seat disposed inside the vehicle cabin; a first planar member that is fixed to the vehicle body, separates the vehicle cabin from an outside of the vehicle, is disposed further toward the outside of the vehicle than the seat in the one direction, and has a first transmittance for visible light; a second planar member that is allowed to be disposed
(Continued)

between the first planar member and the seat, and has a second transmittance for visible light that is smaller than the first transmittance; and an input device. The second planar member is disposed between the first planar member and the seat in a case where a predetermined input is performed on the input device.

25 Claims, 33 Drawing Sheets

(30) Foreign Application Priority Data

Oct. 2, 2018 (JP) .............................. JP2018-187658
Oct. 2, 2018 (JP) .............................. JP2018-187659

(51) Int. Cl.
*B60N 3/00* (2006.01)
*B60R 11/02* (2006.01)

(58) Field of Classification Search
CPC ..... B60R 2011/0005; B60R 2011/0007; B60R 2011/0014; B60N 2/79; B60N 2/793; B60N 2/797; B60N 2/01; B60N 2/012; B60N 2/14; B60N 2/143; B60N 3/00
See application file for complete search history.

(56) References Cited

U.S. PATENT DOCUMENTS

| | | | |
|---|---|---|---|
| 8,162,376 B1 * | 4/2012 | Grossmith | B60J 3/0243 296/97.4 |
| 9,494,940 B1 | 11/2016 | Kentley | |
| 9,783,202 B2 | 10/2017 | Yamada | |
| 11,351,892 B1 * | 6/2022 | Roy | B60R 1/062 |
| 2008/0191534 A1 | 8/2008 | Ropp | |
| 2009/0161302 A1 * | 6/2009 | Ferren | B60R 11/0235 361/679.01 |
| 2009/0302634 A1 * | 12/2009 | Suzuki | B60J 3/02 296/97.6 |
| 2016/0152163 A1 * | 6/2016 | Strasdat | B60R 11/0235 296/64 |
| 2016/0263970 A1 * | 9/2016 | Tamaoki | B60J 3/0213 |
| 2016/0355091 A1 * | 12/2016 | Lee | B60K 35/00 |
| 2017/0013188 A1 * | 1/2017 | Kothari | B60R 1/00 |
| 2017/0050538 A1 | 2/2017 | Akimoto | |
| 2017/0307915 A1 | 10/2017 | Tanaka et al. | |
| 2017/0313248 A1 * | 11/2017 | Kothari | B60R 1/00 |
| 2017/0334455 A1 | 11/2017 | Asakura et al. | |
| 2017/0349069 A1 | 12/2017 | Helot | |
| 2017/0363898 A1 * | 12/2017 | Ishizaka | G02F 1/13336 |
| 2018/0312082 A1 * | 11/2018 | Lalague | B60N 2/01 |
| 2018/0339663 A1 * | 11/2018 | Beauregard | B60N 2/14 |
| 2019/0092170 A1 * | 3/2019 | Gassman | B60J 3/0204 |
| 2020/0086769 A1 * | 3/2020 | Aktas | B60N 2/3022 |
| 2020/0215950 A1 * | 7/2020 | Gomez | B60N 2/79 |
| 2020/0231040 A1 * | 7/2020 | Hwang | B60K 35/00 |
| 2020/0290437 A1 * | 9/2020 | Manatpon | B60J 7/0015 |
| 2020/0331327 A1 * | 10/2020 | Nishio | B60J 3/02 |
| 2021/0016718 A1 * | 1/2021 | Chi | G06F 1/1643 |
| 2021/0212221 A1 * | 7/2021 | Diboine | G09F 21/049 |
| 2021/0309247 A1 * | 10/2021 | Kim | B60N 2/14 |
| 2021/0355740 A1 * | 11/2021 | Hwang | E05F 15/75 |
| 2022/0075191 A1 * | 3/2022 | Rittger | B60K 35/00 |
| 2022/0080829 A1 * | 3/2022 | Choi | B60K 35/00 |
| 2022/0126775 A1 * | 4/2022 | Farooq | B60R 21/231 |
| 2022/0144184 A1 * | 5/2022 | Ouyang | G09F 9/33 |

FOREIGN PATENT DOCUMENTS

| | | |
|---|---|---|
| JP | 2006-321336 | 11/2006 |
| JP | 2008-213827 | 9/2008 |
| JP | 2011-037423 | 2/2011 |
| JP | 2016-069533 | 5/2016 |
| JP | 2016-110114 | 6/2016 |
| JP | 2016-166017 | 9/2016 |
| JP | 2016-218613 | 12/2016 |
| JP | 2017-039468 | 2/2017 |
| JP | 2017-149196 | 8/2017 |
| JP | 2017-206196 | 11/2017 |
| JP | 2018-095208 | 6/2018 |

OTHER PUBLICATIONS

Japan Office Action issued in Japan Patent Application No. 2018-187658, dated May 31, 2022, together with English translation thereof.

Japan Office Action issued in Japan Patent Application No. 2018-187659, dated May 31, 2022, together with English translation thereof.

Toyota Motor Corporation, "Toyota announces concept model "Fine-Comfort Ride" showing further possibilities of fuel cell vehicles", https://newsroom.toyota.co.jp/jp/detail/19063599, Oct. 18, 2017.

International Search Report issued in International Patent Application No. PCT/JP2018/046886, dated Feb. 12, 2019, along with an English translation thereof.

Written Opinion issued in International Patent Application No. PCT/JP2018/046886, dated Feb. 12, 2019, along with an English translation thereof.

* cited by examiner

VEHICLE

CROSS-REFERENCE TO RELATED APPLICATIONS

This application is a continuation of PCT International Patent Application No. PCT/JP2018/046886 filed on Dec. 19, 2018, which claims the benefit of priority of Japanese Patent Application No. 2018-000533 filed on Jan. 5, 2018, Japanese Patent Application No. 2018-187657 filed on Oct. 2, 2018, Japanese Patent Application No. 2018-187658 filed on Oct. 2, 2018, and Japanese Patent Application No. 2018-187659 filed on Oct. 2, 2018, the enter contents of which are incorporated herein by reference.

FIELD

The present disclosure relates to a vehicle capable of performing automated driving.

BACKGROUND

In recent years, the development of automated driving vehicles has been accelerated. In 2016, the National Highway Traffic Safety Administration (NHTSA) adopted the definition of automated driving level of the Society of Automotive Engineers (SAE), and classified the automated driving level into no driving automation (level 0), driver assistance (level 1), partial driving automation (level 2), conditional driving automation (level 3), advanced driving automation (level 4), and full driving automation (level 5).

In the level 0, a human driver does everything. In the level 1, an automated system in a vehicle can occasionally assist a human driver to perform some driving tasks. In the level 2, the automated system of the vehicle can effectively perform some driving tasks, and the human driver monitors a driving environment and keeps performing the rest of the driving tasks. In the level 3, the automated system effectively performs some driving tasks and monitors a driving environment in some cases, and the human driver is prepared to regain control in response to a request made by the automated system. In the level 4, the automated system can perform driving tasks and monitor a driving environment. The human does not have to regain control, but the automated system can operate only under certain circumstances and conditions. In the level 5, the automated system can perform all driving tasks under all conditions that the human driver can perform driving.

In the levels 4 and 5, a human is not read data to be involved in driving. The level 4 is automated driving in a dedicated space or a restricted area, and the level 5 is automated driving in which an area is not restricted. As of 2017, the level 1 is widely used, and the level 2 is partially used. In the level 3, a human is requested to perform driving as necessary while an automated driving system takes the lead in driving.

The levels 1 to 3 require an interface between the automated driving system and the driver in the vehicle. A main notification from the automated driving system to a driver is to present the driver with a behavior of a vehicle determined by the automated driving system. The driver can prepare for the next behavior of the vehicle on the basis of the presented behavior. In the level 3, the automated driving system is required to notify the driver of a request for switching from the driving led by the automated driving system to the driving led by the driver.

There is a technique in which occupants can have a meeting or the like in a vehicle cabin while automated driving is being performed (Toyota Motor Corporation's image video site, Internet (https://newsroom.toyota.co.jp/jp/detail/19063599)), and a partition curtain that makes each occupant's private space comfortable (JP-A-2011-37423), and a seat rotation mechanism (JP-A-2016-166017), and the like are disclosed.

SUMMARY

The above documents propose movement of the partition (curtain) and rotation of the seat to make the inside of the vehicle comfortable, but are not sufficient yet since it has been proposed to realize various activities in the vehicle with the introduction of automated driving.

The present disclosure provides a vehicle in which an occupant of the vehicle can perform various activities while the vehicle is traveling.

According to the present disclosure, there is provided a vehicle including a vehicle body that includes a vehicle cabin; at least one wheel that is disposed along a predetermined one direction in the vehicle body; a seat that is disposed inside the vehicle cabin; a first planar member that is fixed to the vehicle body, separates the vehicle cabin from an outside of the vehicle, is disposed further toward the outside of the vehicle than the seat in the predetermined one direction, and has a first transmittance for visible light; a second planar member that is allowed to be disposed between the first planar member and the seat, and has a second transmittance for visible light that is smaller than the first transmittance; and an input device, in which the second planar member is disposed between the first planar member and the seat in a case where a predetermined input is performed on the input device.

According to the present disclosure, there is provided a vehicle including at least one rotatable wheel; a first seat on which a first occupant can be seated, a second seat on which a second occupant can be seated; a first armrest that is disposed along an advancing direction of the wheel in at least a part of the periphery of the first seat and on which at least a part of the arm of the first occupant can be placed; a second armrest that is disposed along the advancing direction of the wheel in at least a part of the periphery of the second seat and on which at least a part of the arm of the second occupant can be placed; a first touch panel that is disposed inside the first armrest; a second touchscreen that is disposed inside the second armrest; a first cover that is disposed to overlap the first touchscreen and covers at least a part of the first armrest; and a second cover that is disposed to overlap the second touchscreen and covers at least a part of the second armrest, in which the first seat and the second seat are disposed along the advancing direction of the wheel, in which a first backrest of the first seat and a second backrest of the second seat can be disposed to face each other, and in which, in a case where at least the first backrest of the first seat and the second backrest of the second seat are disposed to face each other, the first touchscreen can receive input for at least an item of the vehicle, and the second touchscreen can receive input for at least the item of the vehicle.

According to the present disclosure, there is provided a vehicle including at least one rotatable wheel; a seat on which an occupant can be seated; an armrest that is disposed along an advancing direction of the wheel in at least a part of the periphery of the seat and on which at least a part of the arm of the occupant can be placed; a touchscreen that is disposed inside the armrest; and a cover that is disposed to overlap the touchscreen and covers at least a part of the armrest, in which the seat is rotatable about a rotation shaft along a direction perpendicular to a plane formed by an advancing direction of the wheel and a rotation axis direction of the wheel, in which the armrest is not moved with rotation of the seat, and in which the touchscreen is disposed at a position away from a position of the rotation shaft of the seat in the advancing direction in the armrest.

According to the present disclosure, there is provided a vehicle including at least one rotatable wheel; at least one seat on which an occupant can be seated; an armrest that is disposed along an advancing direction of the wheel in at least a part of the periphery of the seat and on which at least a part of the arm of the occupant can be placed; a light emitting device that is disposed inside the armrest and can emit predetermined light; a touchscreen that is disposed to overlap the light emitting device in the armrest; and a cover that is disposed to overlap the light emitting device and the touchscreen, has a predetermined transmittance for the predetermined light, and covers at least a part of the armrest, in which the touchscreen can detect a position of the occupant's finger along a predetermined plane formed by an advancing direction of the wheel and the rotation axis direction of the wheel, and in which the cover covers the entire surfaces of the light emitting device and the touchscreen, and covers at least 50% of an upper surface of the armrest.

According to the present disclosure, since the second planar member having a smaller transmittance than that of the first planar member is disposed between the first planar member and the seat, visible light passing through the first planar member is blocked, and thus, the intensity of light such as sunlight from the outside of the vehicle body is reduced, so that the periphery of the second planar member becomes a calm environment. It becomes difficult to see the outside scenery, and thus it becomes easier to concentrate on work or the like.

According to the present disclosure, since the touchscreens are respectively provided in the armrests in which the arms can be placed around the seats of the facing occupants, facing occupants can input various items of the vehicle, and thus the comfort in a living mode is improved.

According to the present disclosure, since the touchscreen is disposed at a position away from the position of the rotation shaft of the seat in the advancing direction in the armrest, an occupant can performs various operations on the vehicle even though the seat is rotated.

According to the present disclosure, the cover covers the entire surfaces of the light emitting device and the touchscreen, and also covers at least 50% of the upper surface of the armrest, and thus a unified design feeling is improved.

BRIEF DESCRIPTION OF DRAWINGS

FIGS. 2A and 2B are schematic diagrams illustrating the vehicle according to the present disclosure, in which FIG. 2A is a side view, and FIG. 2B is a positional relationship of wheels.

FIGS. 6A and 6B are conceptual diagrams illustrating an embodiment of a seat rotation mechanism in a vehicle, in which FIG. 6A illustrates the living mode, and FIG. 6B illustrates the business mode.

FIGS. 7A and 7B are conceptual diagrams illustrating another embodiment of a seat rotation mechanism in a vehicle, in which FIG. 7A illustrates the living mode, and FIG. 7B illustrates the business mode.

FIGS. 8A and 8B are schematic diagrams illustrating a disposition of each seat in the vehicle, in which FIG. 8A illustrates the living mode, and FIG. 8B illustrates the business mode.

FIGS. 18A and 18B are schematic diagrams illustrating an armrest, a cover, a touchscreen, and a light emitting device of the present disclosure, in which FIG. 18A is a top view, and FIG. 18B is a sectional view taken along the line A-A in FIG. 18A.

FIGS. 20A and 20B are schematic diagrams illustrating an embodiment of a touchscreen of the present disclosure, in which FIG. 20A illustrates a main switch OFF state, and FIG. 20B illustrates a main switch ON state.

FIGS. 22A to 22C are schematic diagrams illustrating an operation direction of the touchscreen of the present disclosure, in which FIG. 22A illustrates an operation direction 1, FIG. 22B illustrates an operation direction 2, and FIG. 22C illustrates an operation direction 3.

FIGS. 23A and 23B are schematic diagrams following FIGS. 22A to 22C, in which FIG. 23A illustrates an operating direction 4, and FIG. 23B illustrates an operating direction 5.

FIGS. 28A and 28B are plan views of the vehicle cabin for describing a rotation angle of the seat according to another embodiment, in which FIG. 28A illustrates rotation angles of 90 degrees to 180 degrees, and FIG. 28B illustrates a rotation angle of 180 degrees.

FIGS. 31A and 31B are schematic diagrams illustrating a state in which an area of a cover according to still another embodiment is 50%, in which FIG. 31A is a top view, and FIG. 31B is a sectional view taken along the line A-A in FIG. 31A.

DETAILED DESCRIPTION

Hereinafter, an embodiment (hereinafter, referred to as "the present embodiment") specifically disclosing a vehicle according to the present disclosure will be described in detail with reference to the drawings as appropriate. However, detailed description more than necessary may be omitted. For example, detailed description of well-known contents or repeated description of substantially the same configuration may be omitted. This is to prevent the following description from being unnecessarily redundant and to facilitate understanding by those skilled in the art. It should be noted that the accompanying drawings and the following description are provided for those skilled in the art to fully understand the present disclosure, and are not intended to limit the subject matter disclosed in the claims by these.

Hereinafter, the preferable present embodiment for carrying out the present disclosure will be described in detail with reference to the drawings.

A vehicle in which an occupant of the vehicle can perform various activities while the vehicle is traveling will be described in detail. FIGS. 1 to 8B illustrate a configuration common to the present embodiment, and FIGS. 9 to 15 illustrate an embodiment for describing a first planar member and a second planar member in detail, FIGS. 16 to 23B illustrate an embodiment for describing an armrest, a cover, a touchscreen, and the like in detail, FIGS. 24 to 29 illustrate an embodiment for describing the cover in detail, and FIGS. 30 to 33 illustrate an embodiment of the cover.

Hereinafter, a configuration of a vehicle 1 according to the present embodiment will be described with reference to FIG. 1.

Figure 1:
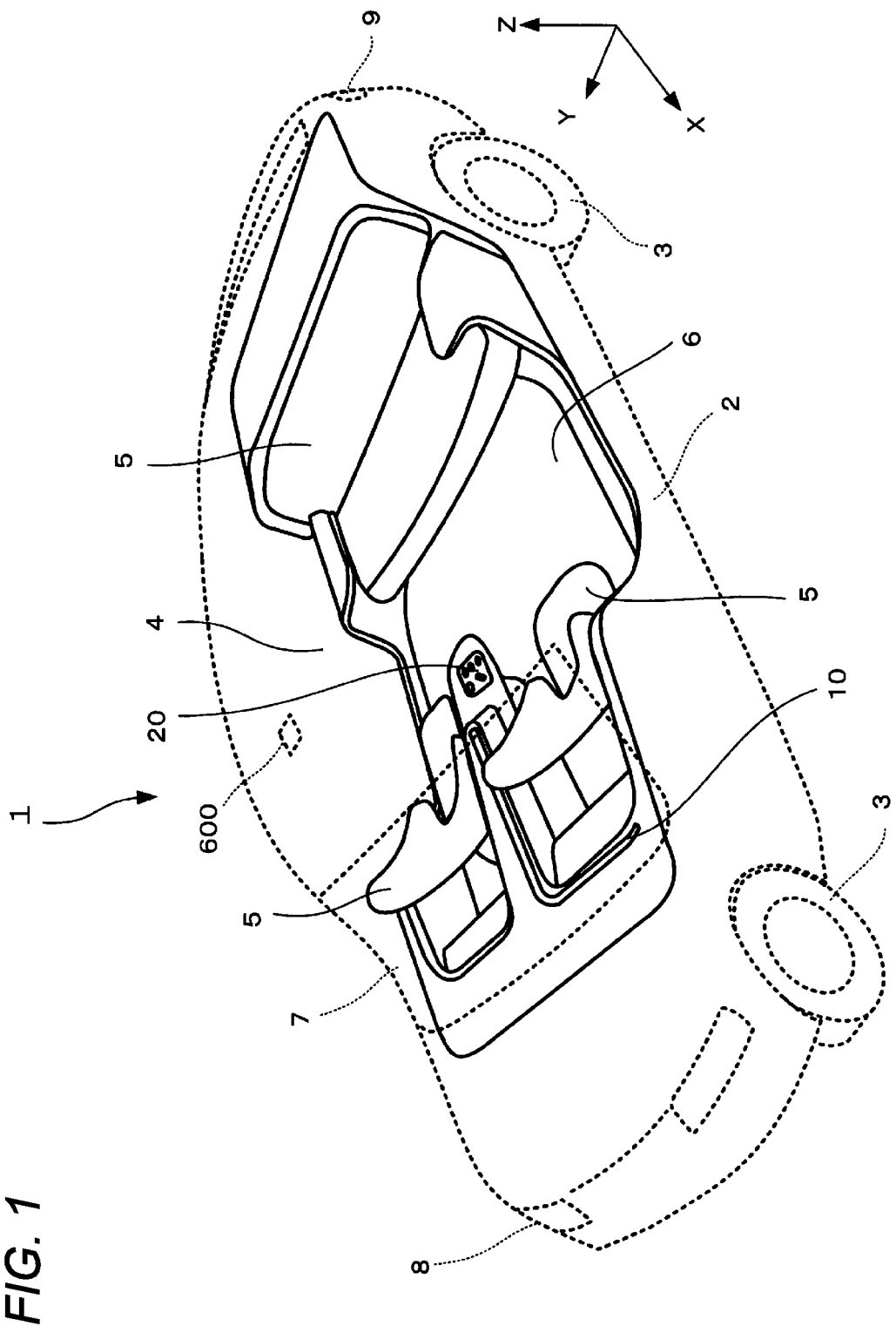
FIG. 1 is a perspective view of a vehicle according to the present disclosure.

FIG. 1 is a perspective view illustrating a vehicle 1 of the present embodiment. As illustrated in FIG. 1, the embodiment of the vehicle 1 exemplifies a vehicle that can perform automated traveling as a vehicle on the basis of the Road Transport Vehicle Act. The vehicle 1 can perform autonomous traveling (automated driving), and a traveling direction such as forward, backward, right/left turn, and rotation is defined as "a predetermined one direction" in the present invention. In the drawing, the predetermined one direction is defined as an X direction, a Y direction is a width direction of the vehicle 1 and is perpendicular to the X direction, and a Z direction is a height direction of the vehicle 1 and is perpendicular to the X direction. The X direction may be a front-rear direction including not only the front but also the rear with respect to the vehicle 1.

The vehicle 1 includes a vehicle body 2 and wheels 3 that form the vehicle 1, a vehicle cabin 4 defined by the vehicle body 2, a plurality of seats 5 disposed in the vehicle cabin 4, and a floor surface 6 forming a part of the vehicle cabin 4, a first planar member 7 such as a windshield, and a plurality of lightings 8 and 9 such as headlights necessary for safe traveling.

The first planar member 7 separates the vehicle cabin 4 from the outside of the vehicle, and is disposed further toward the outside of the vehicle than the seats 5 in the predetermined one direction (X direction). In the vehicle cabin 4 near the first planar member 7, a vertically movable second planar member 10 is disposed between the first planar member 7 and the seats 5, and the first planar member 7 has a first transmittance for visible light, and the second planar member 10 has a second transmittance for visible light smaller than the first transmittance.

An input device 20 that can be operated by an occupant is disposed in the vehicle cabin 4, and can receive input of information required by an occupant in the vehicle cabin 4, such as rotation of the seat 5, operation on the second planar member 10, and wireless communication.

The vehicle 1 is provided with specific lightings 8 and a plurality of other lightings 9 for illuminating the inside and outside of the vehicle. In the present embodiment, at least the lightings 8 are, for example, headlights that can illuminate the outside the vehicle in the predetermined one direction, and can apply stronger light than the other lightings 9. The plurality of lightings 9 include, for example, fog lights, side lights, turn signal lights, tail lights, stop lights, room lights, in addition to the headlights. The other lightings 9 in the embodiment are taillights, but may be other lightings such as turn signal lights.

Figure 2A:
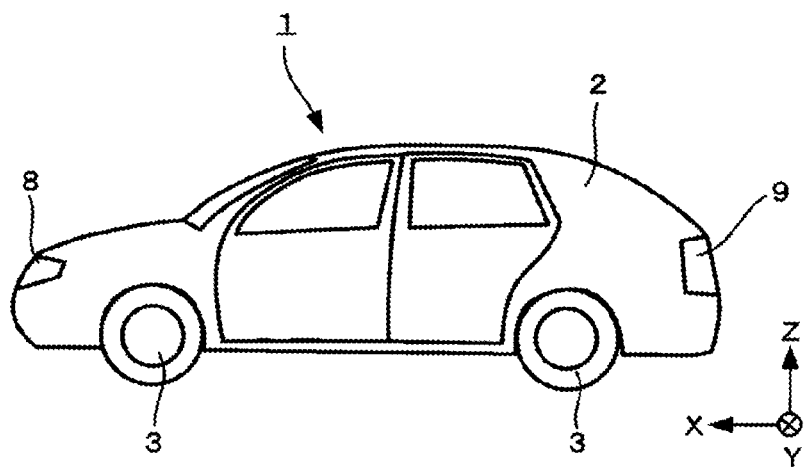
Figure 2B:
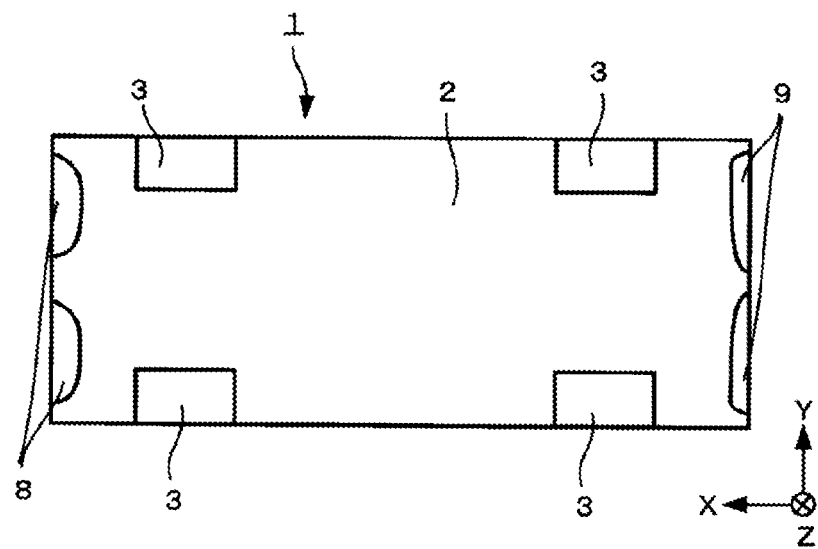

FIGS. 2A and 2B illustrate the vehicle 1, FIG. 2A is a side view, and FIG. 2B is a schematic diagram illustrating a positional relationship among the wheels 3. The vehicle 1 can travel by rotating the wheels 3, and each wheel 3 can be moved or fixed with respect to steering, and thus the vehicle can perform traveling such as going forward, going backward, turning left or right, and rotating. The vehicle 1 of the present embodiment is described by exemplifying a typical four-wheeled passenger vehicle, but a size, a shape, the number of seats, the number of wheels, and the like are not limited.

Figure 3:
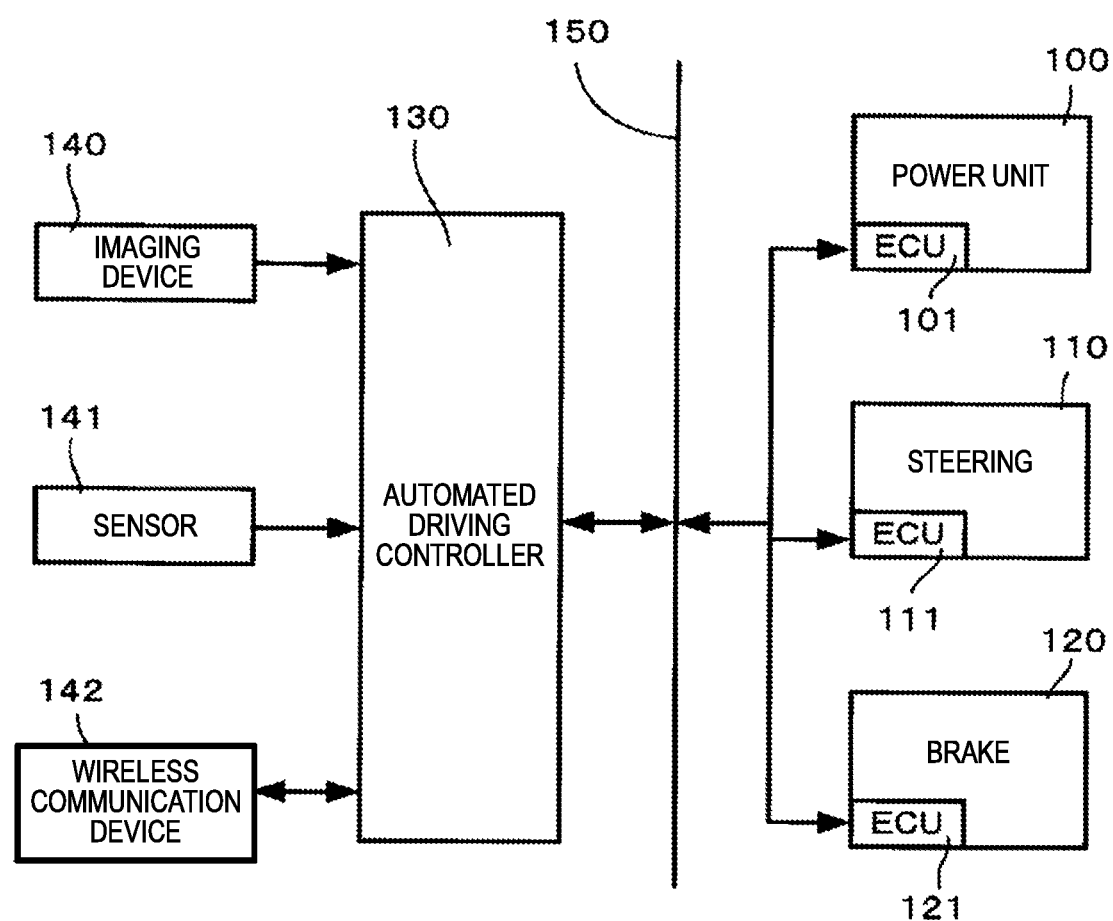
FIG. 3 is a block diagram of the vehicle according to the present disclosure.

FIG. 3 is a block diagram of the vehicle 1 according to the present embodiment. The vehicle 1 according to the present embodiment is a vehicle with the automated driving level 1 or higher, and a vehicle with the level 3 or higher is assumed in the following description. The vehicle 1 includes a power unit 100, a steering 110, a brake 120, an automated driving controller 130, an imaging device 140, a sensor 141, a wireless communication device 142, and an on-vehicle network 150 with a gateway function.

The power unit 100 is a general term for members for accelerating the vehicle 1, and includes an engine and/or a traveling motor, a transmission, a power system electronic control unit (ECU) 101, and the like. The steering unit 110 is a general term for members for turning the vehicle 1, and includes a power steering, a steering system ECU 111, and the like. The brake 120 is a general term for members for decelerating and stopping the vehicle 1, and includes a brake (hydraulic brake/regenerative brake/regenerative cooperation brake), an antilock brake system (ABS), a braking system ECU 121, and the like.

The power system ECU 101, the steering system ECU 111, and the braking system ECU 121 are all connected to the on-vehicle network 150. The on-vehicle network 150 is built by using at least one of standards such as Controller Area Network (CAN), Local Interconnect Network (LIN), FlexRay (registered trademark), and Ethernet (registered trademark). The power system ECU 101, the steering system ECU 111, and the braking system ECU 121 are connected to a main network of the on-vehicle network 150. Hereinafter, in the present embodiment, it is assumed that CAN is used for the main network.

Regarding operation information of the vehicle 1, a driver's operation on an accelerator pedal or the like is converted into an electric control signal, and the control signal is transmitted to the power system ECU 101, the steering system ECU 111, or the braking system ECU 121 via the on-vehicle network 150. The power system ECU 101, the steering system ECU 111, or the braking system ECU 121 controls a corresponding actuator on the basis of the received control signal.

The imaging device 140 is a general term for at least one camera provided in the vehicle 1. For example, as the imaging device 140, visible light cameras are provided at four positions such as a front part, a rear part, and left and right parts of the vehicle 1, and the four visible light cameras capture images of the front, the behind, and the left and the right of the vehicle 1. The imaging device 140 outputs an image signal generated through photoelectric conversion to the automated driving controller 130. Not only visible light but also infrared light sensing camera may be used, and night traveling can be performed more safely.

The sensor 141 is a general term for various sensors (excluding the imaging device 140) for understanding a state of an own vehicle and a situation around the own vehicle. For example, the sensor 141 includes a Light Detection and Ranging (LIDAR), a millimeter-wave radar, a vehicle speed sensor, and a GPS sensor.

The LIDAR radiates a light beam (for example, infrared laser) around the vehicle 1 and receives a reflection signal thereof, and measures a distance to a target object present in the periphery, a size of the target object, and a composition of the target object on the basis of the received reflection signal. The millimeter-wave radar radiates a radio wave (millimeter wave) around the vehicle 1, receives a reflection signal thereof, and measures a distance to a target object present in the periphery on the basis of the received reflection signal. The millimeter wave radar can also detect a distant object which is difficult for the LIDAR to detect. The vehicle speed sensor detects a speed of the vehicle 1. The GPS sensor detects position information of the vehicle 1. Specifically, transmission times are respectively received from a plurality of GPS satellites, and the latitude and longitude of a reception point are calculated on the basis of the plurality of received transmission times.

The wireless communication device 142 performs wireless communication with an external data center, a roadside machine, another vehicle, or the like. For example, a mobile phone network (cellular network), a wireless LAN, Electronic Toll Collection System (ETC), Dedicated Short Range Communications (DSRC), Vehicle-to-Infrastructure (V2I), or Vehicle-to-Vehicle (V2V) may be used.

The automated driving controller 130 stores data necessary for autonomous traveling, such as a three-dimensional map, and subjects the vehicle 1 to autonomous traveling on the basis of a predetermined automated driving algorithm.

Specifically, the automated driving controller 130 recognizes a state of the own vehicle and a situation around the own vehicle on the basis of image data generated by the imaging device 140, various pieces of detection data detected by the sensor 141, and various pieces of information collected from the outside via the wireless communication device 142.

The automated driving controller 130 determines a behavior of the vehicle 1 by applying various parameters indicating the recognized state of the own vehicle and the recognized situation around the own vehicle to the automated driving algorithm. The automated driving controller 130 generates a control command on the basis of the determined behavior, and transmits the control command to the power system ECU 101, the steering system ECU 111, or the braking system ECU 121 via the on-vehicle network 150. The power system ECU 101, the steering system ECU 111, or the braking system ECU 121 controls a corresponding actuator on the basis of the received control command.

The automated driving algorithm is generated by artificial intelligence (AI) based on deep learning, for example. Various parameters of the automated driving algorithm are initialized to values learned by a high-specification computer in advance, and updated values are appropriately downloaded from a data center on the cloud.

The connection form of the on-vehicle network 150 illustrated in FIG. 3 is an example, and various connection forms may be used. For example, in FIG. 3, the imaging device 140, the sensor 141, and the wireless communication device 142 are connected to the automated driving controller 130 via the main network, but the imaging device 140, the sensor 141, and the wireless communication device 142 may be directly connected to each other.

The automated driving controller 130, the power system ECU 101, the steering system ECU 111, the braking system ECU 121, and the on-vehicle network 150 are generated on the basis of the ASIL of the ISO26262 standard. Although not illustrated, an instrument panel including a speedometer, a tachometer, and the like is also generated on the basis of the ASIL of ISO26262 standard.

Information related to autonomous traveling includes a behavior of the vehicle 1 determined by the automated driving controller 130. The automated driving controller 130 may basically display the current behavior of the vehicle 1 (for example, acceleration, deceleration, right turn, or left turn) on a display device (not illustrated) or the like. The automated driving controller 130 may display the next behavior of the vehicle 1 determined on the basis of the automated driving algorithm from a predetermined time before a scheduled time to execute the behavior.

In the vehicle 1 with the automated driving level 3, there is a case where the automated driving controller 130 may determine that autonomous traveling is difficult. For example, it may be difficult to identify a lane on a road where a lane marking is not drawn on a road surface, and thus it may be hard to perform autonomous traveling. In a case of heavy fog or heavy rain, it may be hard to capture a clear image of the front of the vehicle 1, and it may be difficult to perform autonomous traveling. When it is determined that autonomous traveling is hard, the automated driving controller 130 may request a driver to switch driving led by the automated driving controller 130 to driving led by the driver.

Figure 4:
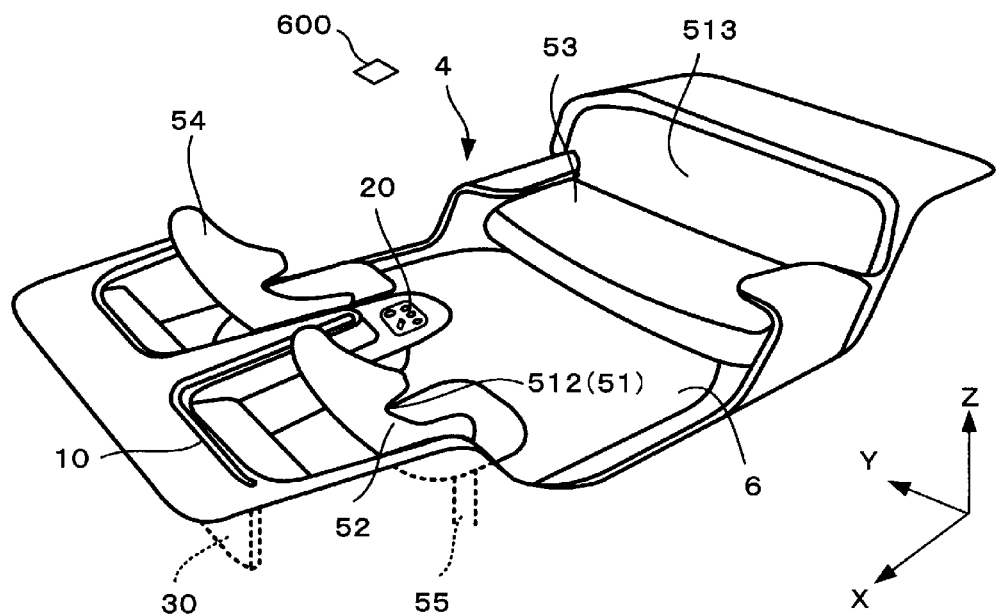
FIG. 4 is a schematic diagram illustrating a disposition in a vehicle cabin in a living mode according to the present disclosure.
Figure 5:
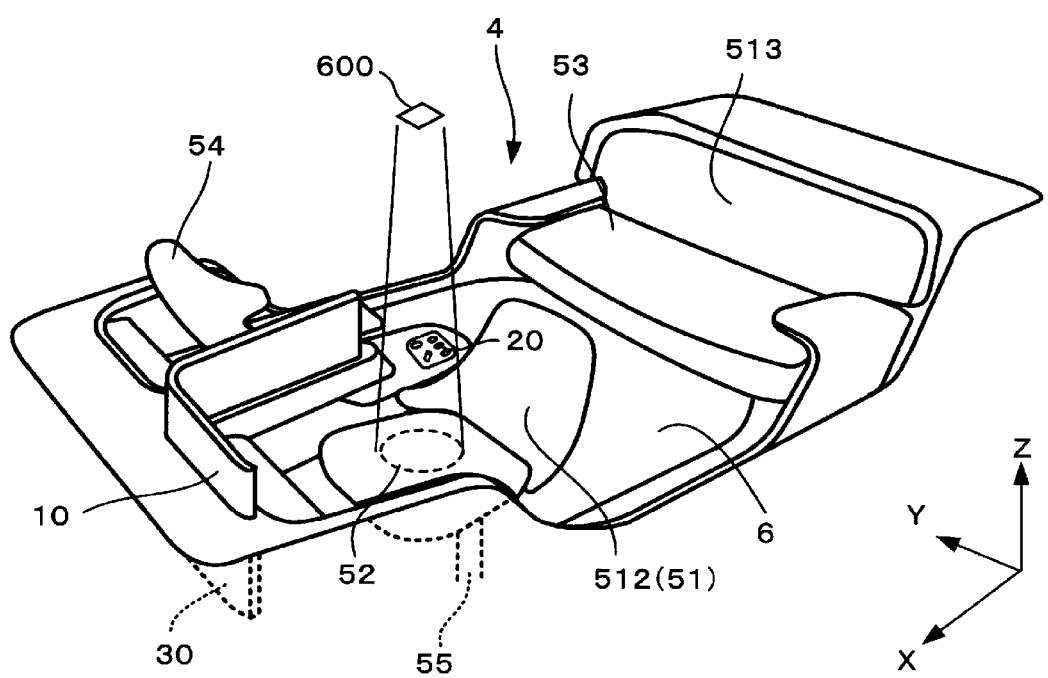
FIG. 5 is a schematic diagram illustrating a disposition in a vehicle cabin in a business mode according to the present disclosure.

FIG. 4 is a schematic diagram illustrating a disposition in the vehicle cabin 4 in a living mode. FIG. 5 is a schematic diagram illustrating a disposition in the vehicle cabin 4 in a business mode. The living mode and the business mode according to the present embodiment will be described with reference to FIGS. 4 and 5.

In the present embodiment, the "living mode" indicates a state in which occupants can face each other and have a chat during automated driving, and the "business mode" indicates a state in which the seats 5 are directed forward as usual and each occupant can concentrate on work. In order to realize this, in the present embodiment, the seats 5 are rotatable and the second planar member 10 is movable up and down. The seats 5 will be described in detail also with reference to FIGS. 6A to 7B.

The seats 5 are respectively provided with backrests 51 and are divided into a first seat 52, a second seat 53, and a third seat 54. The first seat 52, the second seat 53, and the third seat 54 are disposed along the predetermined one direction of the vehicle 1. The first seat 52 and the third seat 54 are disposed along a direction perpendicular to the predetermined one direction. The "direction perpendicular to the predetermined one direction" is a direction perpendicular to the predetermined one direction and along the floor surface 6. In the present embodiment, the first seat 52 will be described as a driver's seat, the second seat 53 will be described as a rear seat, and the third seat 54 will be described as a passenger's seat.

The first seat 52 includes a rotation shaft 55, and the first seat 52 is rotated about the rotation shaft 55 such that a living mode position and a business mode position may be selected.

A backrest 512 of the first seat 52 and a backrest 513 of the second seat 53 face each other, and this leads to a living mode in which an occupant (driver) sitting on the first seat 52 and an occupant (passenger) sitting on the second seat 53 can face each other, so that the occupants can have a face-to-face conversation with each other, and have a meeting or the like (refer to FIG. 4). The third seat 54 may also have the rotation shaft 55 to be rotatable, and the third seat 54 can be rotated automatically or manually. The backrest 512 and the backrest 513 are not required to face each other such that the occupant on the first seat 52 and the occupant on the second seat 53 directly face each other, and may face each other such that the occupants face each other to be able to have a conversation or a meeting.

An in-vehicle lighting 600 that irradiates at least the first seat 52 with light to illuminate the first seat 52 is disposed on a ceiling or the like of the vehicle cabin 4, and may be used as a reading light during the business mode or a lighting during a TV conference.

Figure 6A:
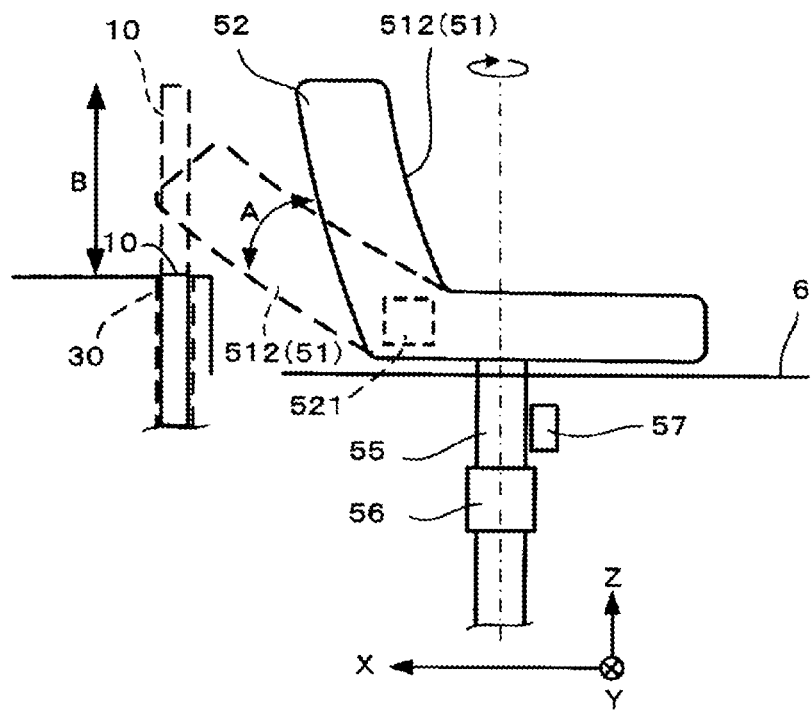
Figure 6B:
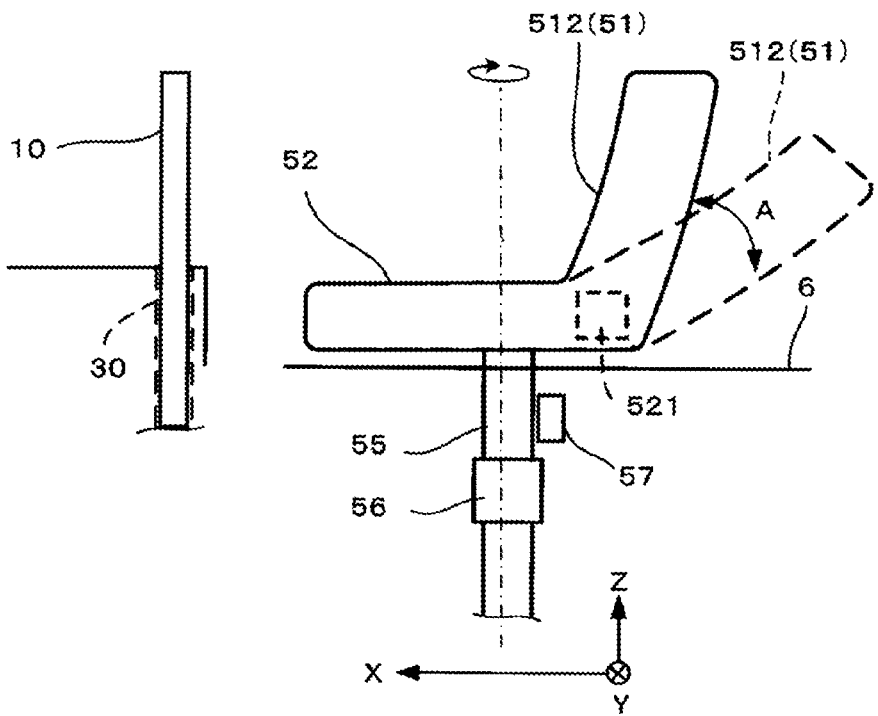

FIGS. 6A and 6B are conceptual diagrams illustrating an embodiment of a rotation mechanism including the rotation shaft 55. The rotation shaft 55 is perpendicular to the floor surface 6 and is rotatable by driving an actuator such as a motor (not illustrated) supported by a bearing 56. Movement of the rotation shaft 55 is detected by a rotation detector 57. FIG. 6A illustrates the living mode, and FIG. 6B illustrates the business mode. The rotation of the first seat 52 may be manually performed. The rotation mechanism may be of a belt type, a gear type, a crank type, or the like, and is not limited to the present embodiment. There is no limitation to the rotation shaft 55, a disk fixed to the seat 5 may be rotated by meshing gears or the like, and is not limited to the present embodiment. The rotation of the first seat 52 may be selected from automatic rotation or manual rotation through the occupant's unlocking.

As indicated by a dashed line, the first seat 52 has a reclining function, and the backrest 512 is rotated in its movable range A by driving a backrest control mechanism 521 such that an inclination angle of the backrest 512 can be changed.

In a case where the occupant on the first seat 52 performs an operation such as manual driving or data input, the backrest 512 of the first seat 52 and the backrest 513 of the second seat 53 face in the same direction, and thus the business mode is set (refer to FIG. 5). That is, the first seat 52 is rotated such that the occupant on the first seat 52 is directed forward on the basis of a positional relationship between the first seat 52 and the second seat 53 in the living mode.

Figure 7A:
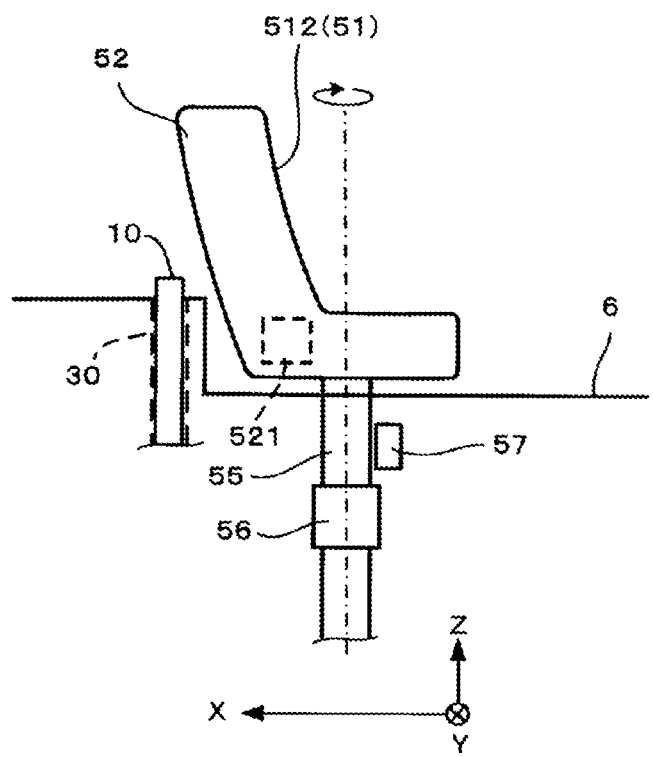
Figure 7B:
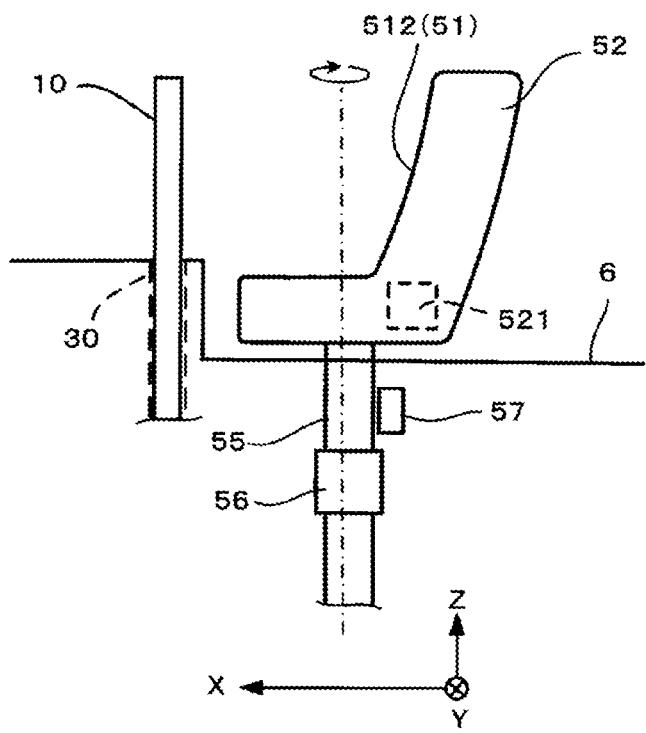

FIGS. 7A and 7B are conceptual diagrams illustrating another embodiment of the rotation mechanism including the rotation shaft 55, in which FIG. 7A illustrates the living mode, and FIG. 7B illustrates the business mode. In the present embodiment, the first seat 52 is disposed at a position closer to the second planar member 10 than in the embodiment in FIGS. 6A and 6B. Thus, in a case where at least the backrest 512 of the first seat 52 and the backrest 513 of the second seat 53 are in a facing state, the backrest 512 of the first seat 52 and the second planar member 10 are disposed to overlap each other in the vertical direction to the floor surface 6 of the vehicle cabin 4.

In a case of this facing state, the second planar member 10 is controlled by controlling at least a part of the second planar member 10 to be stored in the storage 30 regardless of whether or not the backrest 512 reclines. And the backrest 512 can be prevented from interfering with each other. Such control may be performed in the embodiment illustrated in FIGS. 6A and 6B.

Figure 8A:
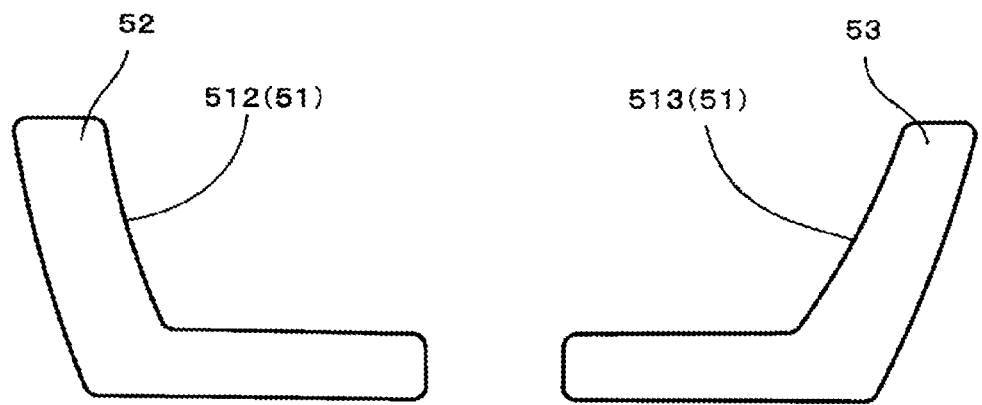
Figure 8B:
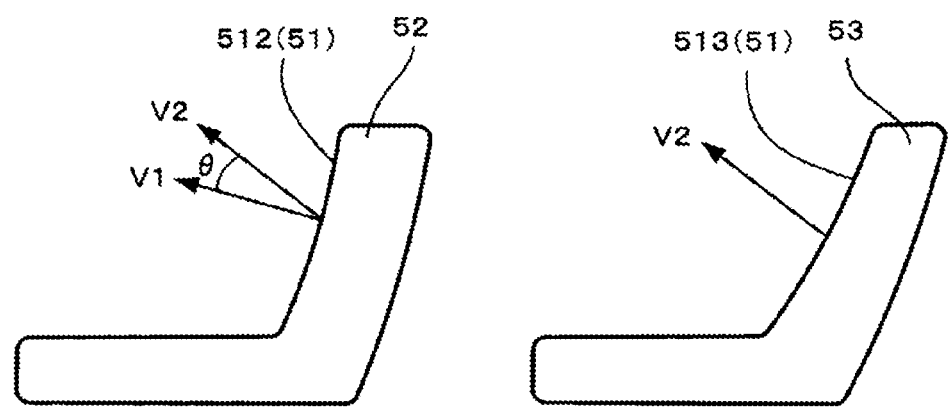

FIGS. 8A and 8B are schematic diagrams illustrating a disposition of the seats 5, in which FIG. 8A illustrates the living mode, and FIG. 8B illustrates the business mode. In the living mode, the backrest 512 of the first seat 52 and the backrest 513 of the second seat 53 face each other, and, in the business mode, the backrest 512 of the first seat 52 and the backrest 513 of the second seat 53 are directed in the same direction. In the business mode, an angle θ formed between a vector V1 perpendicular to the backrest 512 of the first seat 52 and a vector V2 perpendicular to the backrest 513 of the second seat 53 is allowable in a range such as 0° to 20°, 0° to 30°, 0° to 40°, 0° to 60°, 0° to 89°.

As illustrated in FIG. 8A, in a case where at least the backrest 512 of the first seat 52 and the backrest 513 of the second seat 53 are in a facing state, a movable range of the backrest 512 of the first seat 52 may be restricted. Similarly, in a case of FIG. 8A, the second planar member 10 may be controlled not to be disposed between the first planar member 7 and the first seat 52. Through such control, it is possible to prevent interference between the second planar member 10 and the backrest 512 in the living mode.

Figure 9:
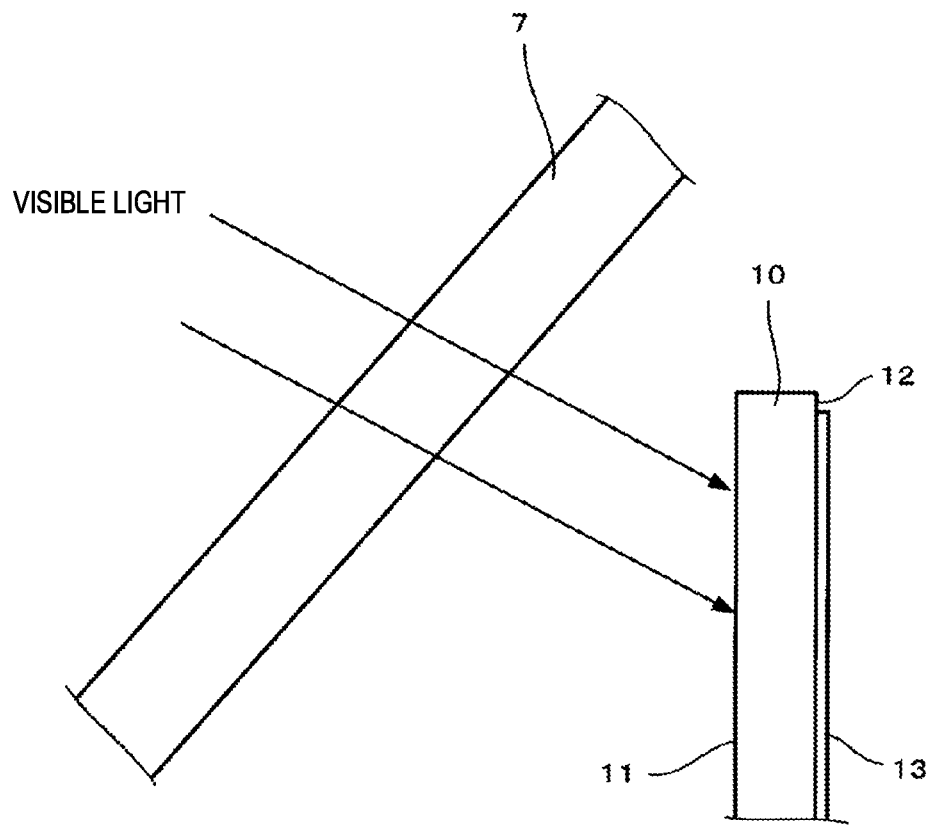
FIG. 9 is a schematic diagram illustrating a visible light transmission relationship between a first planar member and a second planar member according to the present disclosure.

Next, vertical movement of the second planar member 10 will be described in detail with reference to FIGS. 9 to 11.

In the business mode in FIG. 5, the second planar member 10 is moved up from a storage 30 and is exposed in the vehicle cabin 4, and is disposed between the first planar member 7 and the first seat 52. The second planar member 10 has a second transmittance that is smaller than a first transmittance of the first planar member 7, and visible light transmitted through the first planar member 7 is blocked by a first surface 11 of the second planar member 10 as illustrated in FIG. 9 (refer to an arrow in FIG. 9). The second transmittance may be zero.

A rectangular display device 13 or the like is provided on a second surface 12 of the second planar member 10 on the side of the first seat 52 that does not face the first planar member 7. A long side direction of the display device 13 may be along a direction perpendicular to the predetermined one direction. When the long side direction of the display device is disposed along the direction perpendicular to the predetermined one direction, the occupant on the first seat 52 can easily see the display device and easily perform work. The display device 13 may have a square shape, an elliptical shape, or the like, and is not limited to the rectangular shape. A plurality of display devices may be disposed, and a screen thereof may be divided into a plurality of screens.

Figure 10:
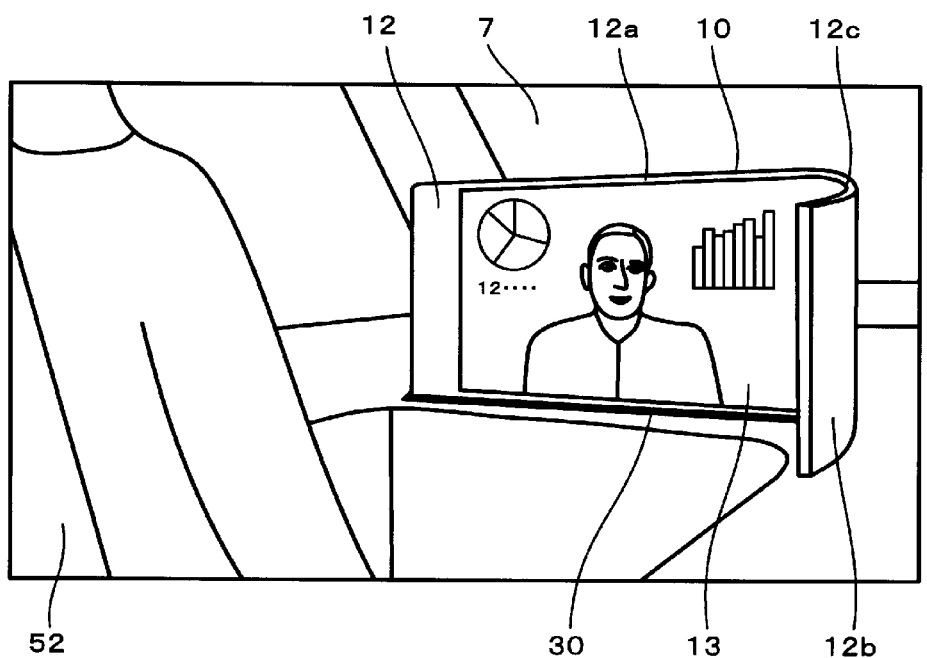
FIG. 10 is a schematic diagram illustrating an embodiment of use of the second planar member according to the present disclosure.

The occupant sitting on the first seat 52 can hold, for example, a TV conference via the display device 13 as illustrated in FIG. 10. There is no limitation to the TV conference, images such as TV conversations, movie contents, and videos of telephone conferences may be displayed, and data may be input and displayed as a terminal, and display contents are not limited. The display device 13 is a display device such as a liquid crystal panel or an organic EL panel, and may be a user interface (UI) type touch panel used to perform various processes by touching the touch panel with a finger or a pen, and may display a screen or the like for inputting information or performing various operations. A screen for a projector or the like may be used.

In the business mode in which the occupant on the first seat 52 works toward the second planar member 10, by blocking the visible light with the second planar member 10, it becomes difficult to see the scenery outside the vehicle 1 and it is possible to block annoying light such as sunlight and street lights, and thus the occupant can easily concentrate on work. Display contents on the display device 13 can be easily viewed, and an environment of the business mode becomes favorable.

Figure 11:
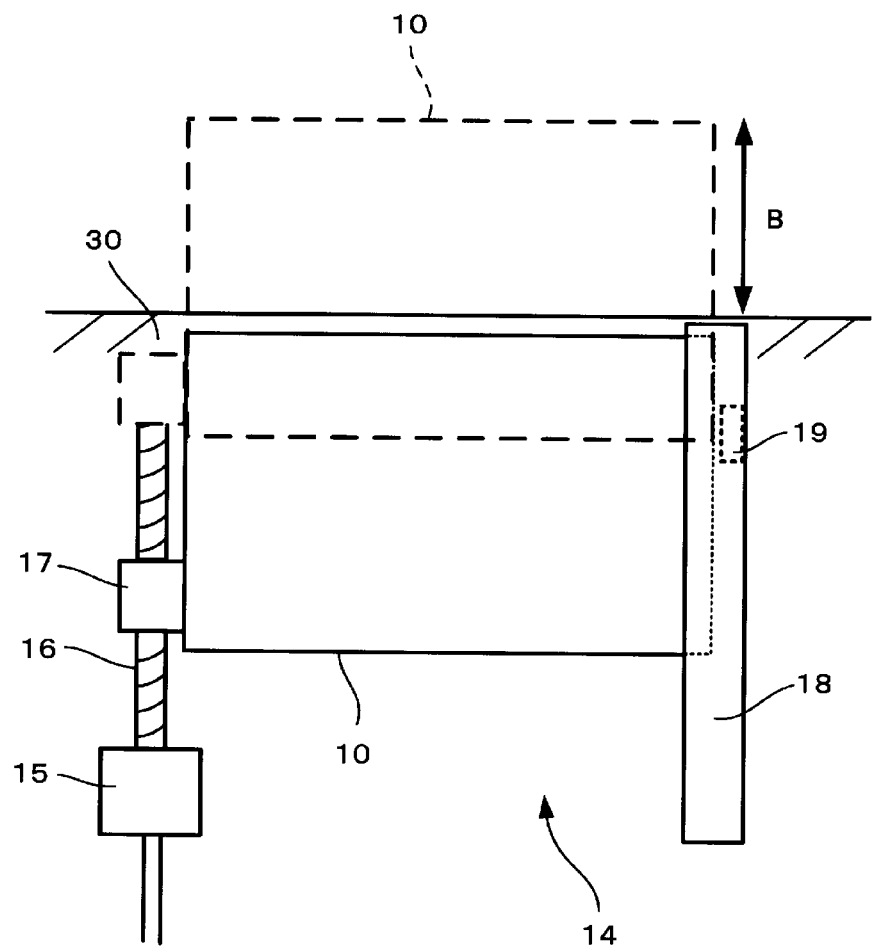
FIG. 11 is a schematic diagram illustrating an embodiment of a movement mechanism of the second planar member according to the present disclosure.

FIG. 11 is a schematic diagram illustrating an example of a movement mechanism 14 for the second planar member 10. An operation of the movement mechanism 14 will be described with reference to FIG. 11.

The movement mechanism 14 in the present embodiment includes a motor 15, a first screw 16, a second screw 17, a rail 18, and a sensor 19. The first screw 16 is rotated by driving the motor 15 such that the second screw 17 screwed to the first screw 16 is moved up and down, and thus the second planar member 10 fixed to the second screw 17 and supported at the rail 18 is moved up and down. A vertical movement state is detected by the sensor 19. In the present embodiment, in the living mode, the second planar member 10 is moved down and is stored in a storage 30, and, in the business mode, the second planar member 10 is moved up and is exposed (standing) from the storage 30, to be disposed between the first planar member 7 and the first seat 52. The second planar member 10 can be move up over a movable range B indicated by a dashed line.

When the second planar member 10 is moved down and is stored, exposure of a part of the second planar member 10 from the storage 30 or exposure of a top surface of the second planar member 10 is a part of the design of a vehicle interior and is defined as storage.

In the present embodiment, the second planar member 10 has a substantially L-shaped section, and the second surface 12 has a front surface part 12a facing the backrest 512 of the first seat 52, and a side surface part 12b extending sideward of the first seat 52 from the front surface part 12a. The display device 13 is disposed on the front surface part 12a, and the side surface part 12b is disposed between the first seat 52 and the third seat 54. The front surface part 12a and the side surface part 12b may be connected via a curved surface 12c, or the second planar member 10 may partially have a curved surface. The side surface part 12b may be located on both sides of the front surface part 12a, and it is easy to block the scenery and the light from the side glass without being limited to the separation from the third seat 54.

Figure 12:
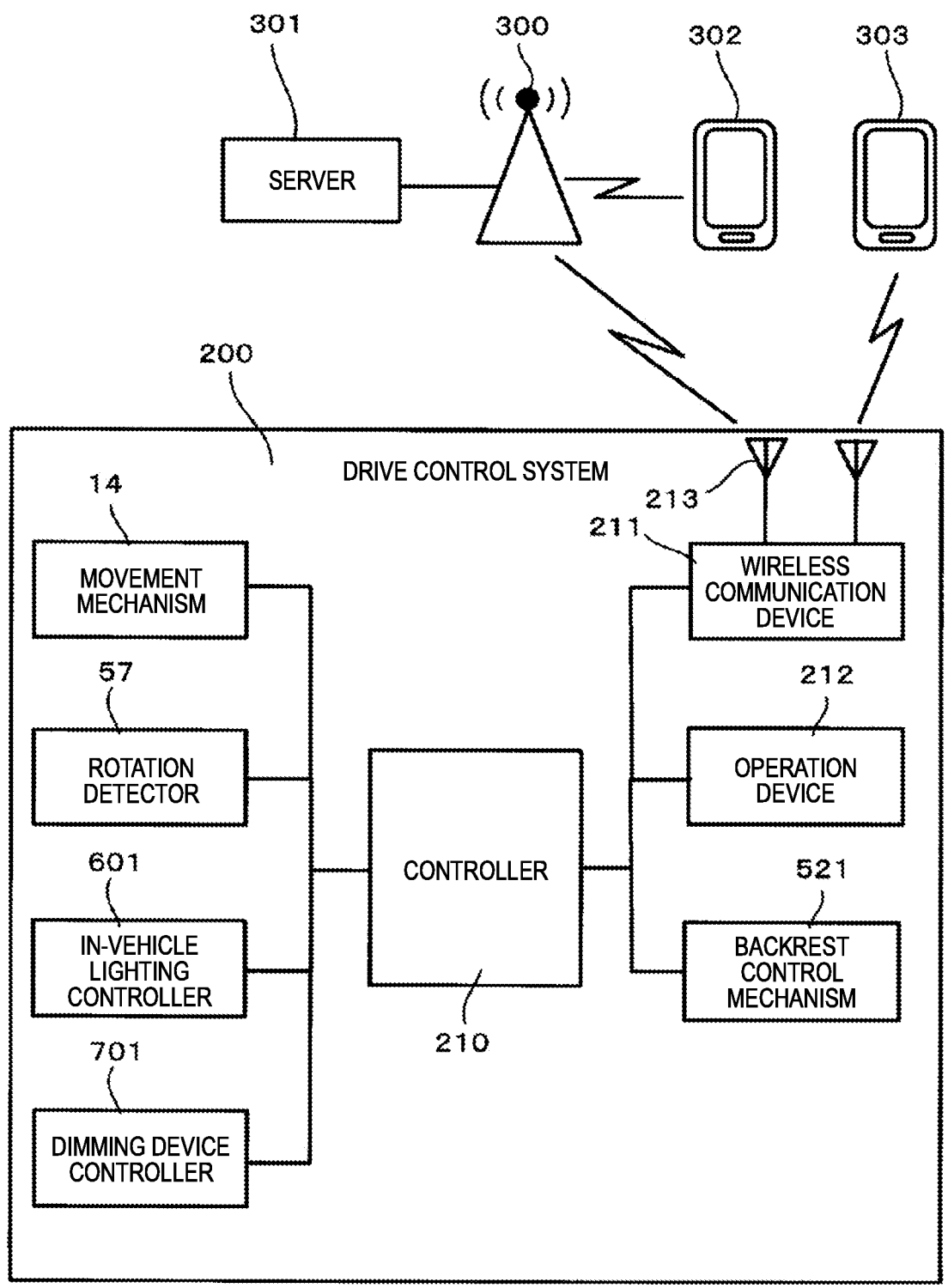
FIG. 12 is a block diagram illustrating an embodiment of a drive control system that controls movement of the second planar member and rotation of the seat according to the present disclosure.

FIG. 12 is a diagram illustrating a drive control system controlling a dimming device 7a (refer to FIG. 15) of the first planar member, a movement of the second planar member 10, rotation of the seat 5, the movable range A of the backrest 512 of the first seat 52, and the in-vehicle lighting 600. The drive control system of the present embodiment will be described with reference to FIG. 12.

A drive control system 200 is an apparatus that controls the dimming device 7a of the first planar member, movement of the second planar member 10, rotation of the seat 5, the movable range A of the backrest of the first seat 52, and the in-vehicle lighting 600, and includes a controller 210, the movement mechanism 14, the rotation detector 57, a wireless communication device 211, an operation device 212, an antenna 213, an in-vehicle lighting controller 601, the backrest control mechanism 521, and a dimming device controller 701.

The controller 210 receives a detection signal from the rotation detector 57 that detects rotation of the first seat 52, and the controller 210 instructs the movement mechanism 14 to start movement. The movement mechanism 14 moves up and down the second planar member 10 on the basis of the instruction.

In addition to the vertical movement of the second planar member, the controller 210 gives an instruction to the dimming device controller 701 capable of directly controlling the dimming device 7a of the first planar member, and thus drives a liquid crystal panel 7b (refer to FIG. 15) of the dimming device 7a to change the transmittance. The controller 210 gives an instruction to the backrest control mechanism 521 to change the movable range A of the backrest of the first seat 52, and further gives an instruction to the in-vehicle lighting controller 601 to change the illuminance of the in-vehicle lighting 600. These may also be performed only partially.

The wireless communication device 211 can communicate with an external base station 300, a server 301, and various terminals 302 such as a smartphone, a key, a mobile phone, and a PC via the antenna 213. The operation device 212 is switches or the like operated by an occupant on the input device 20 disposed in the vehicle cabin 4, and may receive an operation from the occupant. The seat 5 may be rotated or the second planar member 10 may be moved up and down by touching the operation device 212.

The seat 5 and the second planar member 10 may be operated from the server 301, the terminal 302, or the like. Communication can be received from the various terminals 302 and the server 301 via the base station 300 according to a cell method or the like, and, in a case where direct communication with the terminal 302 is performed, short-range radio communication (for example, Bluetooth (registered trademark)) or the like may be used.

Here, the input device 20 may include the wireless communication device 211 that receives an input operation, the rotation detector 57 that detects rotation of the seat 5, and the like, in addition to the operation device 212 described above.

Figure 13:
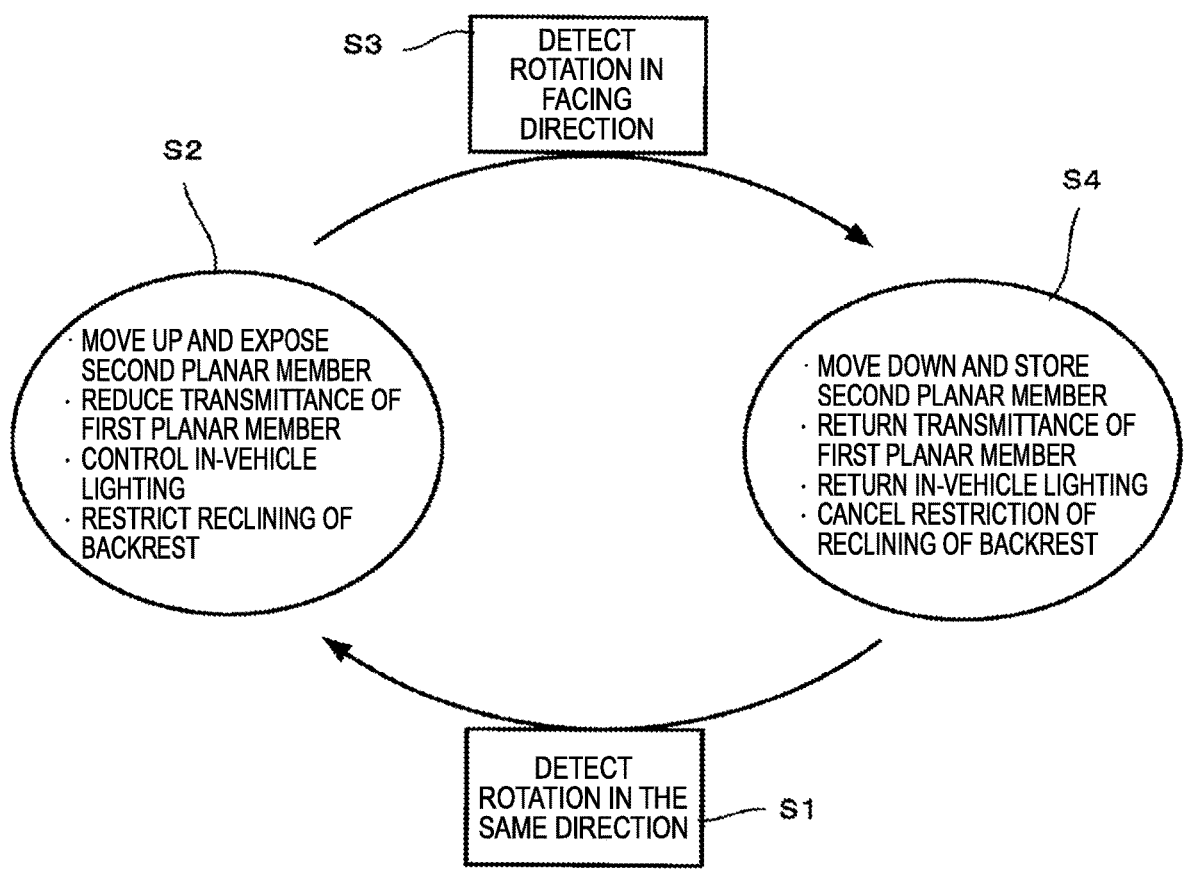
FIG. 13 is a conceptual diagram illustrating a relationship between a rotation detector and the second planar member according to the present disclosure.

FIG. 13 is a conceptual diagram illustrating a relationship between the rotation detector 57 and the second planar member 10. An operational relationship between the rotation detector 57 and the second planar member 10 will be described with reference to FIG. 13.

In a case where the first seat 52 is rotated, and the rotation detector 57 detects that the backrest 512 of the first seat 52 and the backrest 513 of the second seat 53 are directed in the same direction (S1), the controller 210 instructs the movement mechanism 14 to move up the second planar member 10, and moves the movement mechanism 14 to expose the second planar member 10 from the storage 30. The controller 210 gives an instruction to the dimming device controller 701 capable of directly controlling the dimming device 7a of the first planar member to drive the liquid crystal panel 7b of the dimming device 7a such that a transmittance thereof is controlled (specifically, the transmittance is reduced as will be described later). The controller 210 gives an instruction to the in-vehicle lighting controller 601 to change the illuminance of the in-vehicle lighting 600. The controller 210 gives an instruction to the backrest control mechanism 521 to restrict the movable range A of the backrest of the first seat 52 (S2).

In a case where the first seat 52 is rotated in the state of S2, and the rotation detector 57 detects that the backrest 512 of the first seat 52 and the backrest 513 of the second seat 53 face each other (S3), the controller 210 instructs the movement mechanism 14 to move down the second planar member 10, the movement mechanism 14 is moved, and thus the second planar member 10 is stored in the storage 30. The controller 210 gives an instruction to the dimming device controller 701 capable of directly controlling the dimming device 7a of the first planar member, drives the liquid crystal panel 7b of the dimming device 7a, and returns the transmittance. The controller 210 gives an instruction to the in-vehicle lighting controller 601 to return the illuminance of the in-vehicle lighting 600. The controller 210 gives an instruction to the backrest control mechanism 521 to cancel the restriction on the movable range A of the backrest of the first seat 52 (S4).

In the above control, the in-vehicle lighting controller 601 controls the illuminance of the in-vehicle lighting 600 to be increased in a case where the second planar member 10 is disposed between the first planar member 7 and the first seat 52. Consequently, a work environment in the business mode becomes more comfortable. Since regions of the seats other than the first seat 52 are relatively dark, it is possible to protect the privacy of other occupants. In a situation such as a TV conference illustrated in FIG. 10 in which a dialogue with the other party occurs, the other party (for example, the person displayed on the display device 13) can easily concentrate on the dialogue, and thus an environment in which the dialogue can be performed more easily is provided.

Specifically, in a case where a predetermined input is performed on an input device such as the operation device 212, the wireless communication device 211, or the rotation detector 57, the movement mechanism 14 is operated on the basis of an instruction from the controller 210, and thus the second planar member 10 is brought into a predetermined state in which the second planar member is disposed between the first planar member 7 and the first seat 52. In a case of the predetermined state, the in-vehicle lighting controller 601 increases the illuminance of the in-vehicle lighting 600, so that the in-vehicle lighting 600 sets an illuminance on a seat surface of the first seat 52 to a first illuminance. On the other hand, in a case where the second planar member is not in the predetermined state, the in-vehicle lighting controller 601 reduces the illuminance of the in-vehicle lighting 600, so that the in-vehicle lighting 600 sets the illuminance on the seat surface of the first seat 52 to a second illuminance lower than the first illuminance.

In such a series of control, it is necessary to pay particular attention to interference between the first seat 52 and the second planar member 10. As illustrated in FIG. 6A, the movable range A of the backrest 512 and the movable range B of the second planar member 10 may overlap, and thus interference between the backrest 512 and the second planar member 10 may occur depending on an angle of rotation of the first seat 52. Such interference may occur during transition between the business mode and the living mode.

Therefore, the backrest control mechanism 521 restricts the movable range A of the backrest 512 of the first seat 52 on the basis of an instruction from the controller 210 when the first seat 52 and the second seat 53 transition between a facing state (FIGS. 6A and 8A) and a state of being directed in the same direction (FIGS. 6B and 8B). The restriction may be performed by reducing an angle of the movable range A or by setting the angle to 0. Since such a restriction is possible, the interference between the backrest 512 and the second planar member 10 is prevented even though the first seat 52 is rotated regardless of a position of the second planar member 10.

Through the control, it is allowed that the reclining movable range A of the backrest 512 and the movable range B of the second planar member (refer to FIG. 11) overlap each other. That is, the reclined first seat 52 can be installed close to the second planar member 10, which is advantageous in utilizing the interior space of the vehicle. The movable range A of the backrest 512 may be controlled to be restricted such that the second planar member 10 and the backrest 512 do not interfere with each other until the storage of the second planar member 10 is completed, that is, in a state in which the second planar member 10 is exposed.

The rotation of the first seat 52 may be manually performed by performing an input operation on the input device 20. There may be a threshold value related to detection performed by the rotation detector 57, and a predetermined angle or rotation is may be detected, and the controller 210 may instruct the movement mechanism 14 to move up and down the second planar member 10.

In the facing state in which the first seat 52 and the second seat 53 face each other, the controller 210 may perform control such that the second planar member 10 is in a storage state (refer to FIG. 6A). As a result, it is possible to prevent interference between the first seat 52 and the second planar member 10 without restricting the movable range A of the backrest 512.

Figure 14:
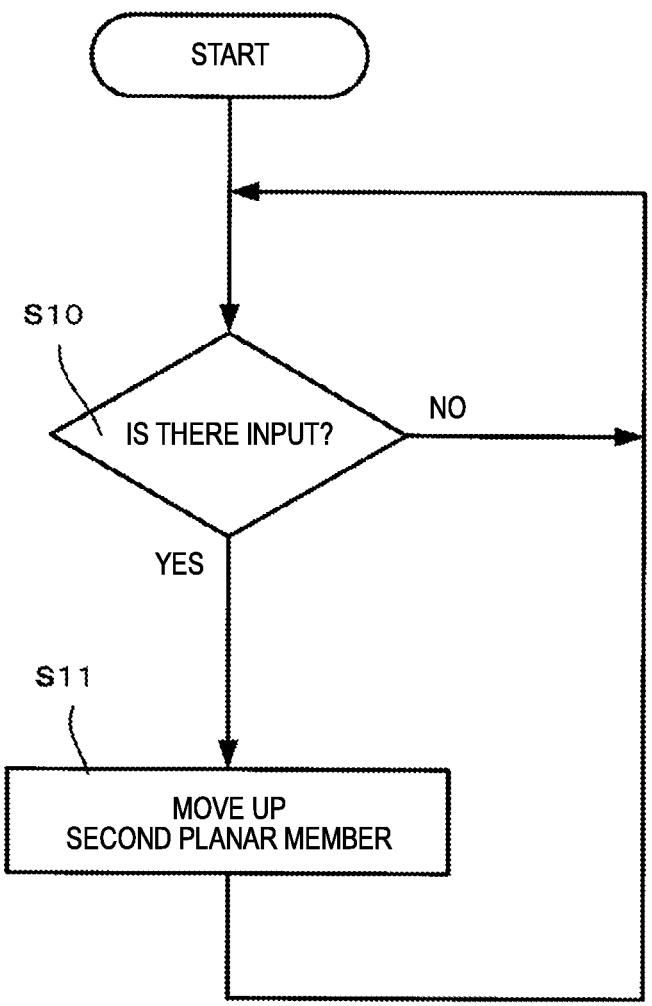
FIG. 14 is a flowchart illustrating operation steps of the second planar member according to the present disclosure.

FIG. 14 is a flowchart illustrating operation steps of the second planar member 10. The controller 210 determines whether or not there is an input signal in the input device 20 (S10). The input signal is transmitted from the operation device 212 such as a switch, the wireless communication device 211 that receives an input operation from the terminal 302 or the like, the rotation detector 57 that detects rotation of the seat 5, and the like. In a case where it is determined that there is an input signal, the controller 210 drives the movement mechanism 14 to move up the second planar member 10 (S11). The same applies in a case of moving down the second planar member 10.

Figure 15:
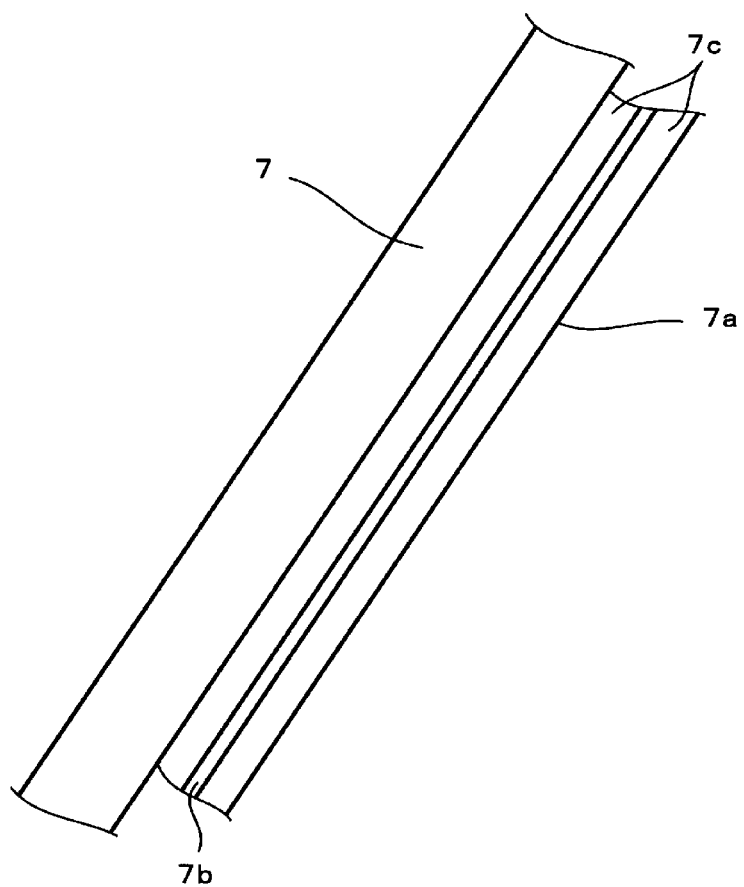
FIG. 15 is a partial sectional view illustrating another embodiment of the first planar member according to the present disclosure.
Figure 16:
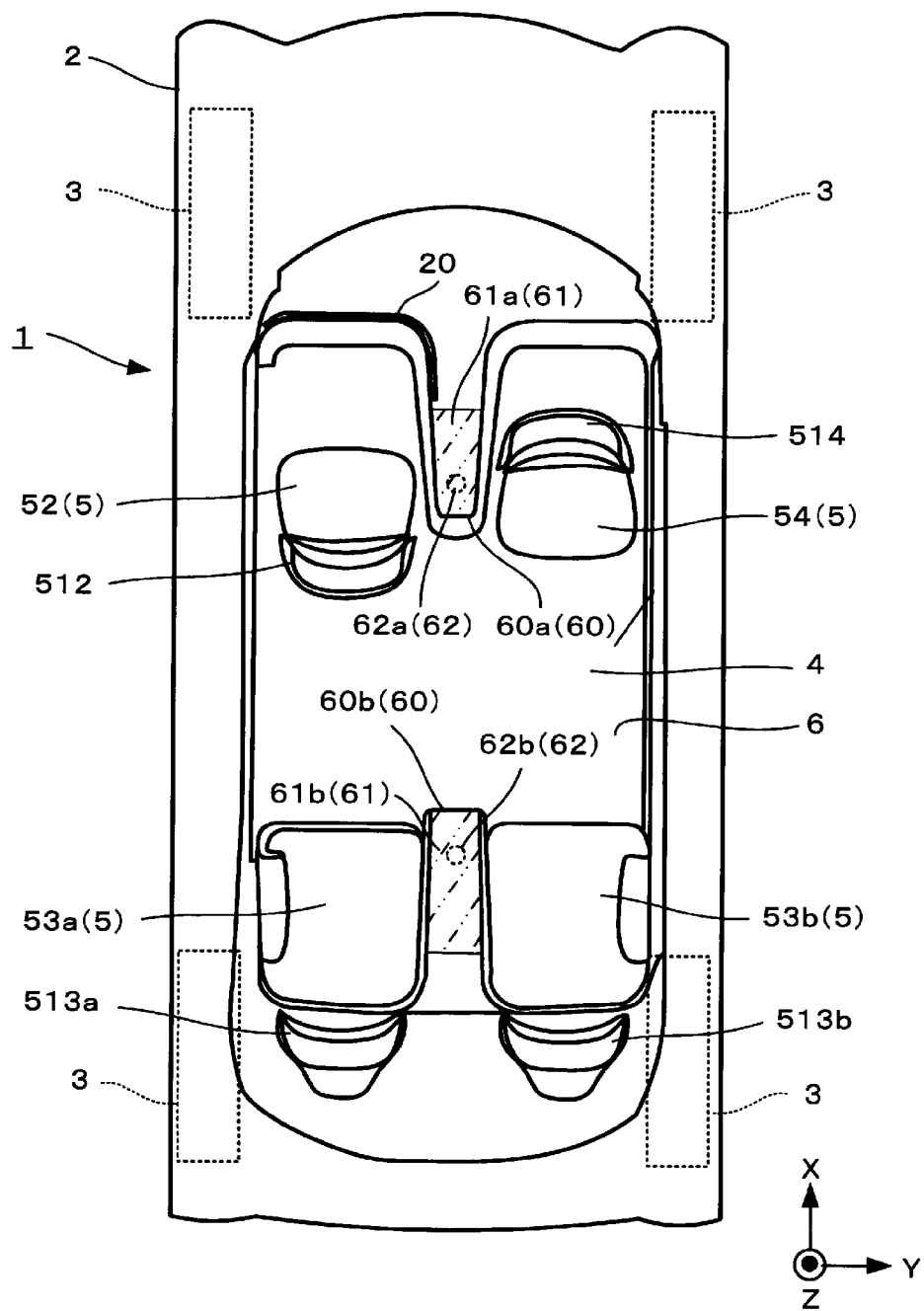
FIG. 16 is a plan view of the vehicle cabin of the vehicle according to the present disclosure.
Figure 17:
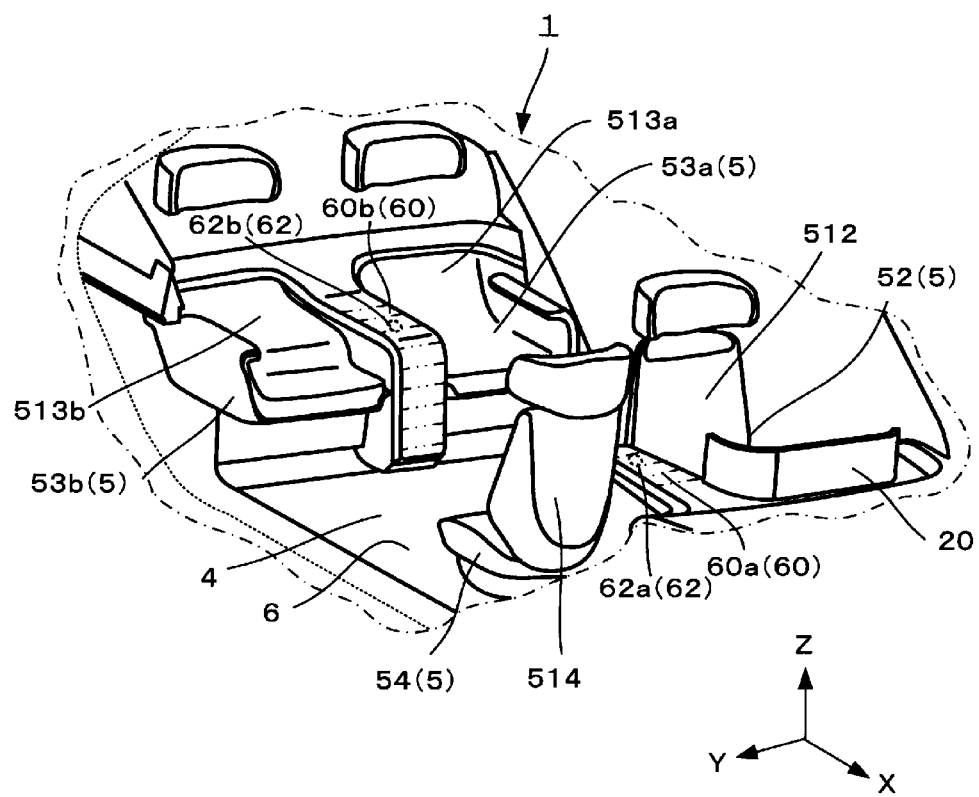
FIG. 17 is a partial perspective view of the vehicle cabin in FIG. 16.

FIG. 15 is a partial sectional view illustrating another embodiment of the first planar member 7. The first planar member 7 is provided with a dimming device 7a that changes the transmittance. The dimming device 7a may be attached to the second planar member 10 or may be integrally molded. The dimming device 7a of the present embodiment has a structure in which the liquid crystal panel 7b is sandwiched between two glass plates 7c. In particular, a work environment can be improved by changing the transmittance with the dimming device 7a and interlocking with the business mode during the daytime, in the evening, or when the sunlight is too bright. For the dimming device, Japanese Patent Laid-Open Publication No. 2016-69533 and US Application Publication No. 2017/0307915, which are family publications, may be referred to.

The first transmittance of the first planar member 7 can be changed in two or more steps by employing such a dimming device 7a, and thus the first transmittance of the first planar member 7 can be controlled to be reduced in a case where the second planar member 10 is disposed between the first planar member 7 and the first seat 52. By reducing the transmittance of the first planar member 7, the shielding load on the second planar member 10 is reduced, and thus it is possible to increase the number of selectable materials.

Next, another embodiment will be described in detail with reference to FIGS. 16 to 23B.

In FIG. 1, a description has been made of a case where the input device 20 that is operable by an occupant is disposed in the vehicle cabin 4, and can receive input of information required by the occupant in the vehicle cabin 4, such as rotation of the seat 5, operation on the second planar member 10, and wireless communication. In the present embodiment, description of a disposition of the input device 20 will be omitted, and an armrest adjacent to a seat, and a cover, a touchscreen, and a light emitting device provided on the armrest will be described in detail with reference to FIGS. 16 to 18B.

In FIG. 1, the description has been made of a case where a traveling direction is defined as "a predetermined one direction", and, in the drawing, the predetermined one direction is an X direction, a Y direction is a width direction of the vehicle 1 and is perpendicular to the X direction, and a Z direction is a height direction of the vehicle 1 and is perpendicular to the X direction.

In the present embodiment, the "predetermined one direction" is further defined as an "advancing direction of the wheels 3", and a width direction (Y direction) of the vehicle 1 perpendicular to the advancing direction of the wheels 3 is defined as a "rotation axis direction of the wheels 3".

In FIG. 4, the description has been made of a case where the backrest 512 of the first seat 52 and the backrest 513 of the second seat 53 face each other, and this leads to the living mode in which an occupant (driver) sitting on the first seat 52 and an occupant (passenger) sitting on the second seat 53 can face each other, so that the occupants can have a face-to-face conversation with each other, and have a meeting or the like. It has been described that the third seat 54 is rotated such that an occupant thereon can face an occupant on the second seat 53.

In the present embodiment, the second seat 53 is defined as a second seat 53a, and a seat adjacent to the second seat 53a is defined as a fourth seat 53b. A first occupant can be seated on the first seat 52, a second occupant can be seated on the second seat 53a, and a third occupant can be seated on the third seat 54, and the fourth seat 53b is defined as the seat 5 on which a fourth occupant can be seated.

The first seat 52 and the second seat 53a, and the third seat 54 and the fourth seat 53b are disposed along the advancing direction (X direction) of the wheels 3, and the first seat 52 and the third seat 54, and the second seat 53a and the fourth seat 53b are disposed along the rotation axis direction (Y direction) of the wheels 3.

In the vehicle 1 of the present embodiment, armrests 60 fixed to the vehicle 1 are disposed adjacent to the seats 5. A first armrest 60a is disposed along the advancing direction of the wheels 3 in at least a part of the periphery of the first seat 52, and the first occupant may place at least a part of the arm thereof on the first armrest. A second armrest 60b is disposed along the advancing direction of the wheels 3 in at least a part of the periphery of the second seat 53a, and the second occupant may place at least a part of the arm thereof on the second armrest. At least a part of the first armrest 60a is disposed between the first seat 52 and the third seat 54, and at least a part of the second armrest 60b is disposed between the second seat 53a and the fourth seat 53b.

Figure 18A:
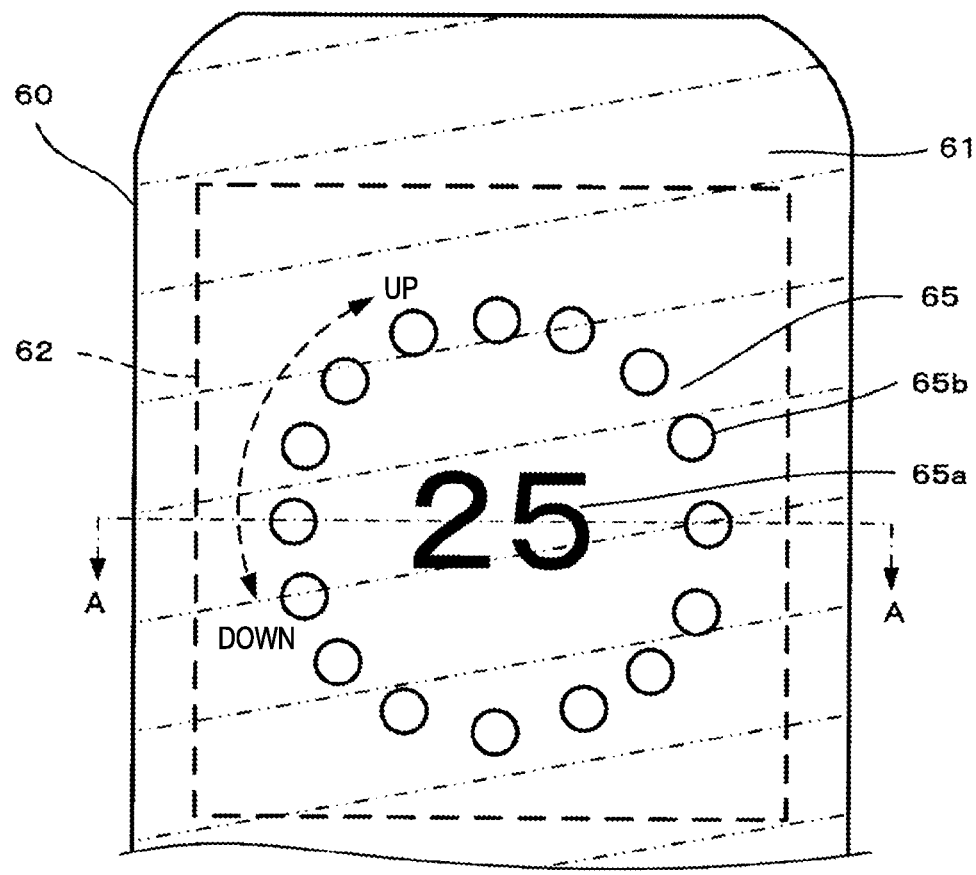
Figure 18B:
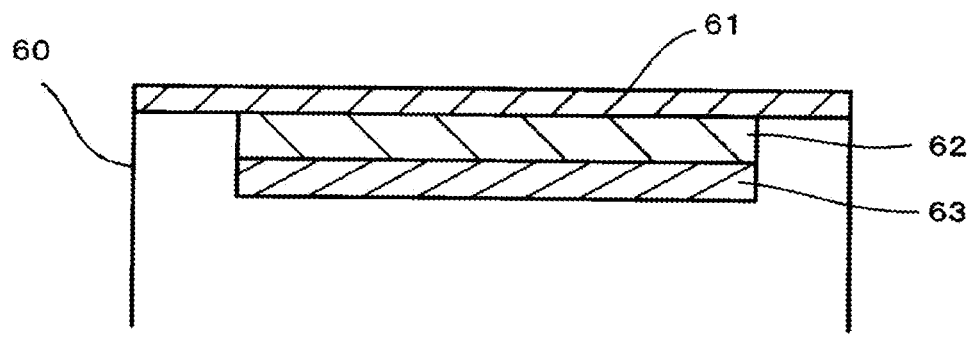

As illustrated in FIGS. 18A and 18B, the armrest 60 is covered with a light-transmissive cover 61, and has a touch panel 62 disposed inside the armrest 60 covered with the cover 61 and a light emitting device 63 serving as a light source.

The cover 61 covers the armrest 60 partially or entirely, that is, covers at least a part of the armrest 60, has a predetermined transmittance for predetermined light such as visible light, includes a decorative cover or the like, and has a woodgrain or a carbon fiber tone, or is made of real wood. At least a part of the cover 61 covered with a two-dot chain line has a pattern such as a woodgrain (common in all the drawings). The touchscreen 62 is of a user interface (UI) type that is touched with a finger or a pen such that various processes are performed, and may display a screen for performing information input or various operations. The light emitting device 63 is a liquid crystal panel, an organic electroluminescence (EL), a micro light emitting diode (LED), or the like, and can emit predetermined light such as visible light. The cover 61, the touchscreen 62, and the light emitting device 63 are disposed in an overlapping manner. In the present embodiment, the cover 61, the touchscreen 62, and the light emitting device 63 are disposed in this order in an overlapping manner.

More specifically, the first armrest 60a is provided with a first cover 61a, a first touchscreen 62a, and a first light emitting device 63a, and the second armrest 60b is also provided with a second cover 61b, a second touchscreen 62b, and a second light emitting device 63b.

Figure 19:
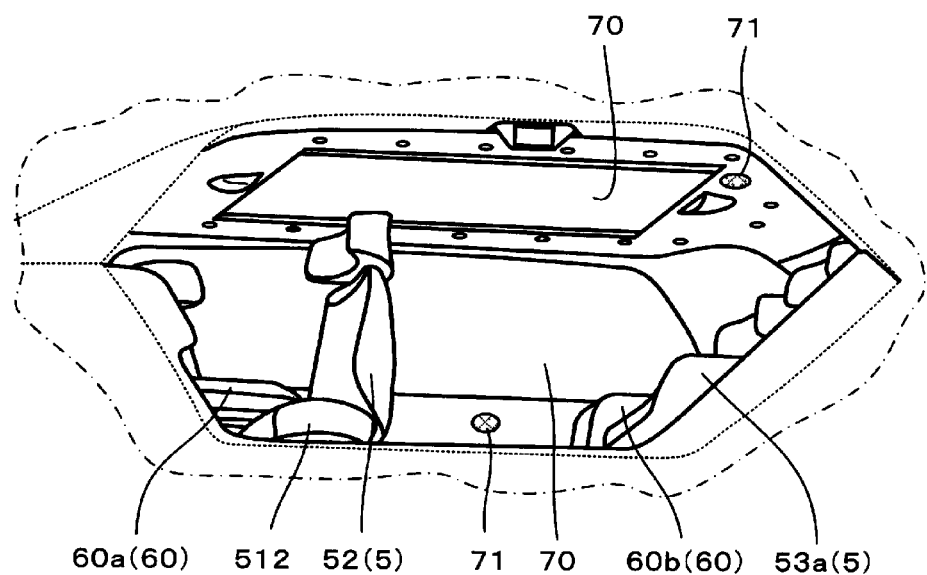
FIG. 19 is a partial perspective view of the vehicle cabin in FIG. 16.

As illustrated in FIG. 19, the vehicle 1 further includes a display device 70 operable by using the touchscreen 62 and a sound output device 71.

The display device 70 is disposed between the first seat 52 and the second seat 53a, and is also disposed between the third seat 54 and the fourth seat 53b. Not only the first occupant and the second occupant, but also all occupants including the third occupant sitting on the third seat 54 and the fourth occupant sitting on the fourth seat 53b effectively view a content 70b or the like which will be described later on the display device 70. The display device 70 is disposed on the side surface, the ceiling, or the like of the vehicle cabin (interior) 4 of the vehicle 1 such that the vehicle cabin 4 can be effectively used.

The sound output device 71 which is a speaker is disposed on the side surface of the vehicle cabin 4 between the first seat 52 and the second seat 53, in the same manner as the display device 70, and can output sound contents. The sound output device 71 may be disposed on the ceiling in the vehicle cabin 4.

In a case where the first backrest 512 of the first seat 52 and the second backrest 513a of the second seat 53a are disposed to face each other, the touchscreen 62 can receive input to create an environment suitable for the living mode. Then, the first touchscreen 62a can receive input for at least an item of the vehicle 1, and the second touchscreen 62b can receive input for at least an item of the vehicle 1. As a result, the facing occupants can perform various operations on the vehicle 1, and thus the comfort in the living mode is increased.

The backrest 512 of the first seat 52 and the backrest 513*a* of the second seat 53*a* are not required to face each other such that the first occupant on the first seat 52 and the second occupant on the second seat 53*a* directly face each other, and may face each other such that the occupants face each other to be able to have a conversation or a meeting. Facing between the third backrest 514 of the third seat 54 and the fourth backrest 513*b* of the fourth seat 53*b* applies in the same manner for the third occupant and the fourth occupant.

The items of the vehicle 1 are temperature setting in air conditioning of the vehicle cabin 4, music selection, output volume setting of an audio device, an operation of the pointer 70*a* of the display device 70, and the like, and also include information regarding a destination, an estimated time of arrival at the destination, and the like in correspondence with a display content on the display device 70.

Figure 20A:
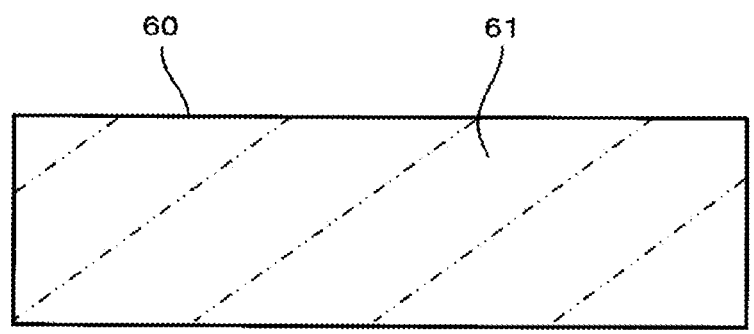
Figure 20B:
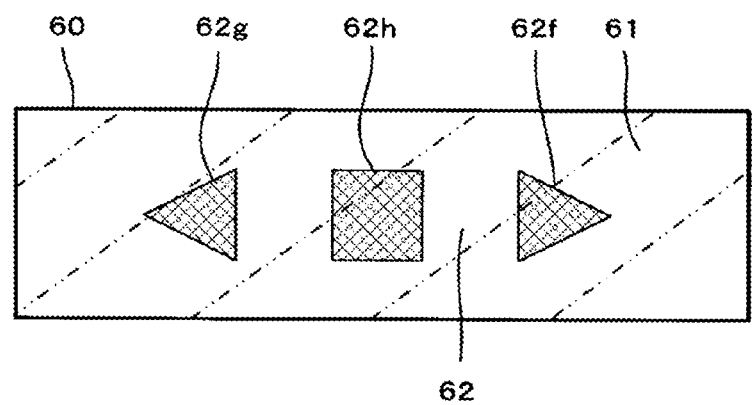

For example, as illustrated in FIGS. 20A and 20B, as an item of the vehicle 1, fast forwarding and/or fast rewinding of audio contents may be performed. Until a main switch (for example, an ignition key of the vehicle 1) provided separately from the touchscreen 62 is input, only the appearance of the natural wood of the cover 61 is viewed, and marks 62*f*, 62*g*, and 62*h* corresponding to the items are not displayed (refer to FIG. 20A). When the main switch is input, the light emitting device 63 is turned on, and the marks 62*f*, 62*g*, 62*h* are displayed on the touchscreen 62 (refer to FIG. 20B).

For example, the occupant can fast forward audio contents by touching the mark 62*f* displayed on the touchscreen 62, fast rewind the audio contents by touching the mark 62*g*, and stop, play, and select the audio contents by touching the mark 62*h*.

In order to realize the item, in the present embodiment, as illustrated in FIGS. 18A and 18B, a ring-shaped operable button 65 is displayed on the touchscreen 62. The occupant can operate the button 65 by touching, dragging, or flicking, the buttons. The button 65 has a number (including characters) 65*a* displayed in the center and an annular portion 65*b* formed of a plurality of segments to surround the number 65*a*.

In a case where the occupant sets a temperature of air conditioning, when the annular portion 65*b* is rotated, the number 65*a* representing the set temperature is changed, such as 20, 21, and 22, and thus a temperature desired by the occupant can be set. The temperature may be increased when the annular portion 65*b* is flicked clockwise, and may be decreased when the annular portion is flicked counterclockwise.

Switching may be performed from temperature setting to volume setting by double-touching or flicking the button 65. In a case where the annular portion 65*b* is flicked clockwise, the volume emitted from the sound output device 71 may be increased, and, in a case where the annular portion is flicked counterclockwise, the volume may be decreased.

Figure 21:
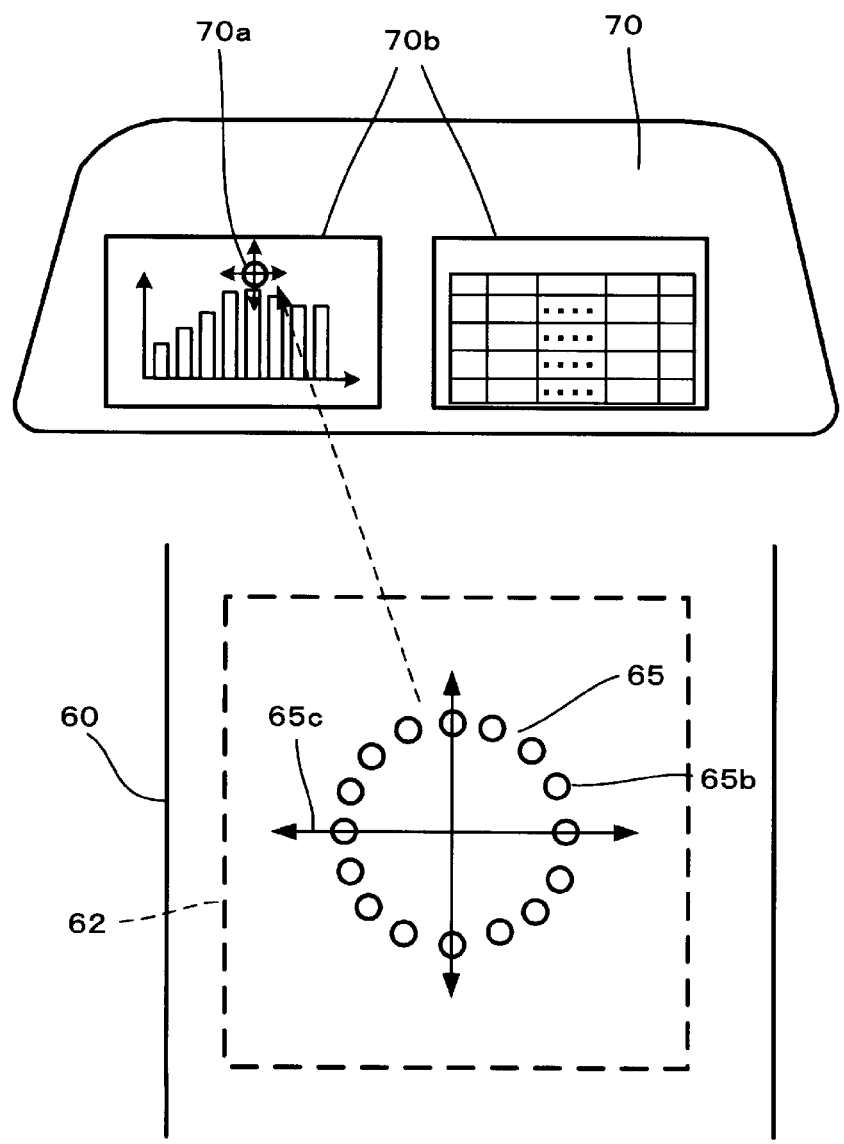
FIG. 21 is a schematic diagram illustrating examples of items of the vehicle of the present disclosure.

As illustrated in FIG. 21, the button 65 displayed on the touchscreen 62 has a two-dimensional coordinate axis corresponding to the display device 70 in order to receive an input operation for the item of the vehicle 1. The coordinate axis may be displayed. An arrow coordinate axis 65*c* perpendicular to the annular portion 65*b* from the center is set, and a two-dimensional coordinate designated on the coordinate axis 65*c* is displayed on the display device 70 as a pointer 70*a*. In a case where contents 70*b* are displayed on the display device 70, the item of the vehicle 1 is two-dimensional coordinates of the display device 70, and is scrolling of the contents in the vertical direction and/or the horizontal direction. As a result, the touchscreen 62 and the display device 70 can be linked, and thus conversations, meetings, and the like can be performed in a comfortable environment.

The contents 70*b* displayed on the display device 70 may be information downloaded from a content server built on an external cloud via a communication network, or information downloaded from a portable terminal apparatus carried by an occupant. By linking the display device 70 with the button 65, various pieces of information can be displayed and operated.

A direction in which the touchscreen 62 is operated will be described with reference to FIGS. 22A to 23B. An operation direction is indicated by an arrow on the drawings. In a case where the first backrest 512 of the first seat 52 and the second backrest 513*a* of the second seat 53*a* are disposed to face each other, directions in which the first occupant on the first seat 52 and the second occupant on the second seat 53 operate the respective touchscreens have a relationship illustrated in FIGS. 22A to 23B.

Figure 22A:
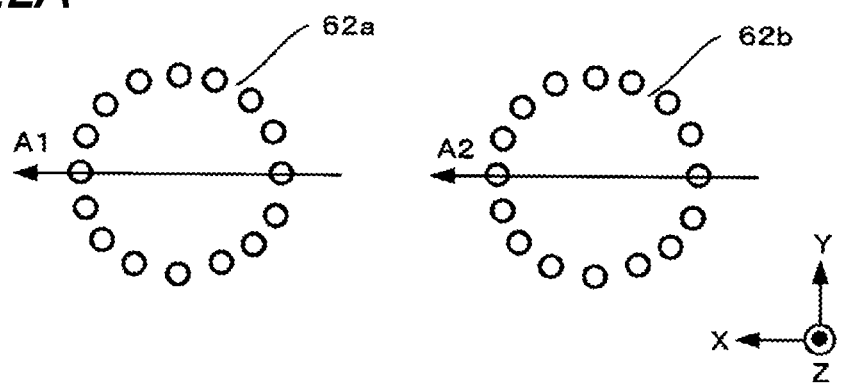

In an operation direction 1 illustrated in FIG. 22A, first input A1 on the first touchscreen 62*a* in a predetermined orientation along the advancing direction of the wheels 3 and second input A2 on the second touchscreen 62*b* in the predetermined orientation along the advancing direction of the wheels 3 have the same meaning. That is, regarding an operation direction for the touchscreen 62, operation directions for the first touchscreen 62*a* and the second touchscreen 62*b* are the same orientation along the advancing direction of the wheels 3.

Figure 22B:
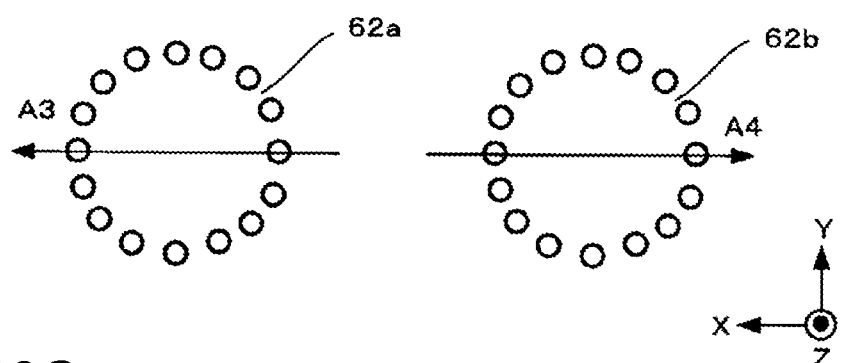

In an operation direction 2 illustrated in FIG. 22B, third input A3 on the first touchscreen 62*a* in a first orientation along the advancing direction of the wheels 3 and fourth input A4 on the second touchscreen 62*b* in a second orientation opposite to the first orientation along the advancing direction of the wheels 3 have the same meaning. That is, regarding an operation direction for the touchscreen 62, operation directions for the first touchscreen 62*a* and the second touchscreen 62*b* are opposite directions along the advancing direction of the wheels 3.

Figure 22C:
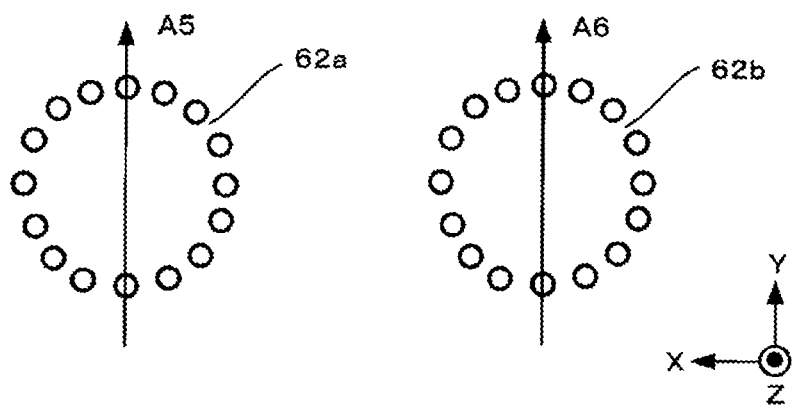

In an operation direction 3 illustrated in FIG. 22C, fifth input A5 on the first touchscreen 62*a* in a predetermined orientation along the rotation axis direction of the wheels 3 and sixth input A6 on the second touchscreen 62*b* in the predetermined orientation along the rotation axis direction of the wheels 3 have the same meaning. That is, regarding an operation direction for the touchscreen 62, operation directions for the first touchscreen 62*a* and the second touchscreen 62*b* are the same orientation along the rotation axis direction of the wheels 3.

Figure 23A:
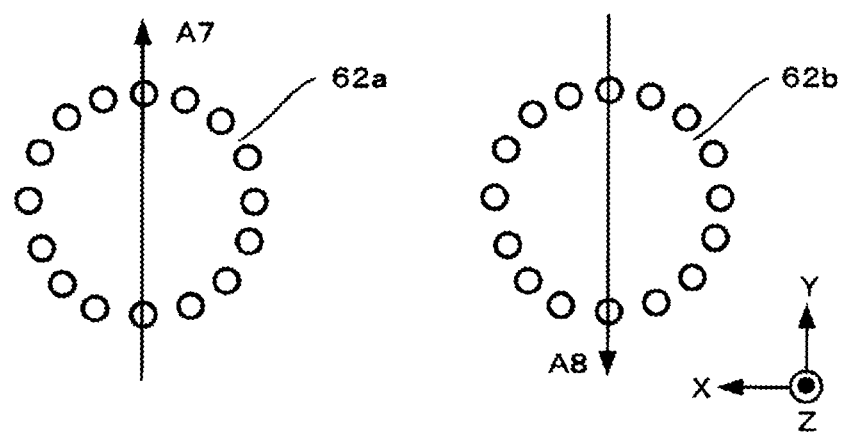

In an operation direction 4 illustrated in FIG. 23A, seventh input A7 on the first touchscreen 62*a* in a third orientation along the rotation axis direction of the wheels 3 and eighth input A8 on the second touchscreen 62*b* in a fourth direction opposite to the third orientation along the rotation axis direction of the wheels 3 have the same meaning. That is, regarding an operation direction for the touchscreen 62, operation directions for the first touchscreen 62*a* and the second touchscreen 62*b* are opposite directions along the rotation axis direction of the wheels 3.

Figure 23B:
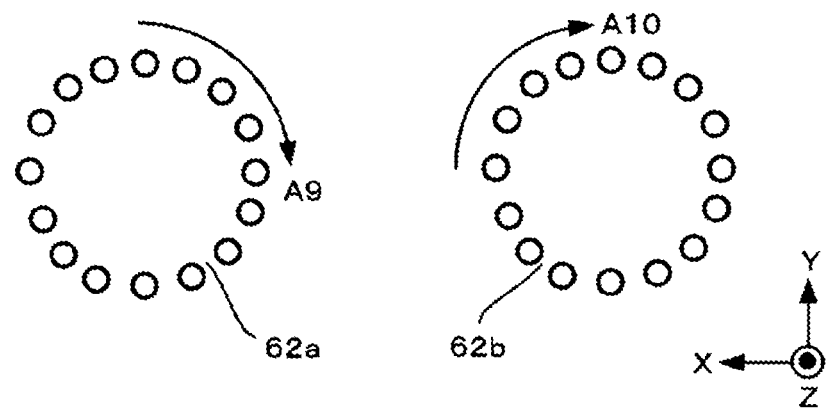

In an operation direction 5 illustrated in FIG. 23B, clockwise ninth input A9 on the first touchscreen 62*a* and clockwise tenth input A10 on the second touchscreen 62*b* have the same meaning. That is, regarding an operation direction for the touchscreen 62, operations are performed along the annular portion 65b in the same rotation direction on both of the two. Operations may be performed in opposite rotation directions.

An operation direction of the touchscreen 62 may be appropriately selected depending on the item of the vehicle 1, the content 70b on the display device 70, a seating position of the occupant, and the like.

Although the ring-shaped button 65 has been described, a slide switch or the like for direct operation may be displayed.

Since the armrest 60 is covered with the cover 61 having a predetermined transmittance for visible light or the like, the visual recognition of the touchscreen 62 is suppressed when the light emitting device 63 is turned off, and thus the appearance of the vehicle cabin 4 is improved.

Still another embodiment will be described in detail with reference to FIGS. 24 to 29.

In FIGS. 6A and 6B, a description has been made of a case where the first seat 52 includes the rotation shaft 55, the first seat 52 is rotated about the rotation shaft 55 such that a living mode position and a business mode position are selected, and the rotation shaft 55 is perpendicular to the floor surface 6 and is rotatable by driving an actuator such as a motor (not illustrated) supported by the bearing 56.

Figure 24:
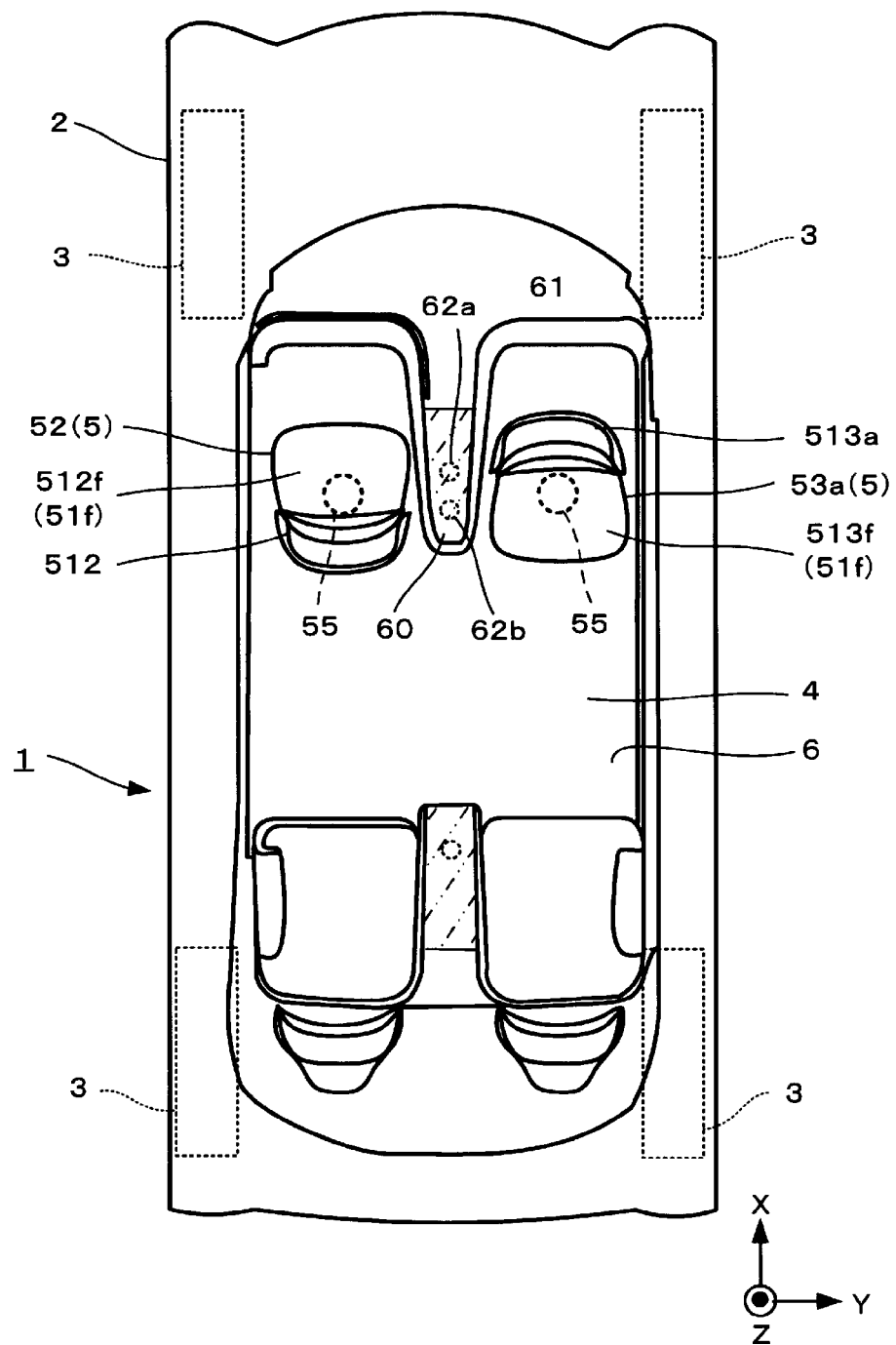
FIG. 24 is a plan view of a vehicle cabin of a vehicle according to another embodiment.

In the present embodiment, the seat 5 is defined to be rotatable about a rotation shaft along a direction perpendicular to a plane formed by the advancing direction of the wheels 3 and the rotation axis direction of the wheels 3. The formed plane is a horizontal plane, and the floor surface 6 is also parallel to the horizontal plane. As illustrated in FIG. 24, the seat 5 has the backrest 51, and also has a seat surface 51f for seating. The backrest 51 and the seat surface 51f are located in the vehicle 1, and can be fixed at a predetermined position at all times while the seat 5 is rotated, and the backrest 51 can also be fixed while being reclined.

Figure 25:
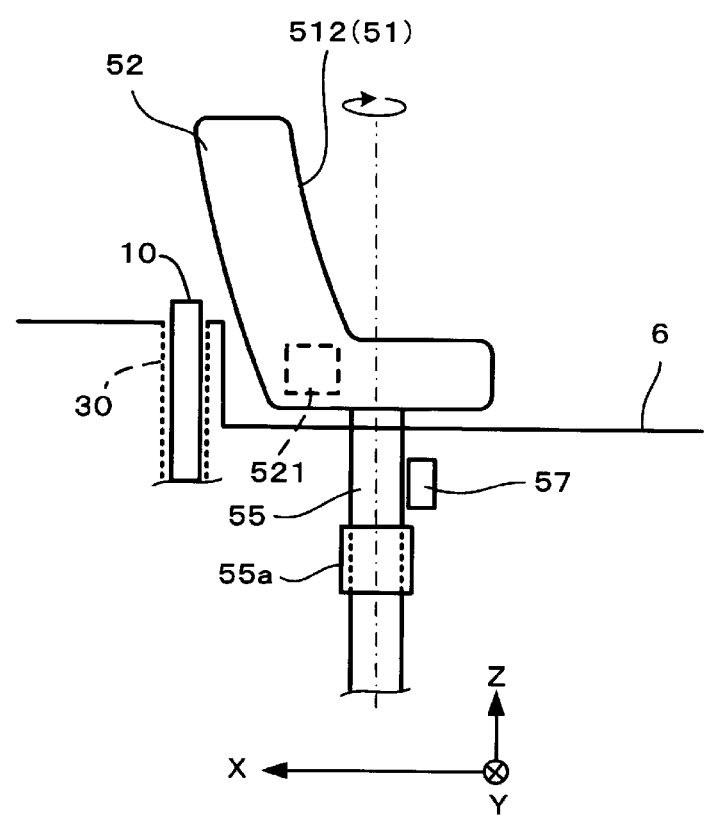
FIG. 25 is a conceptual diagram illustrating another example of a seat rotation mechanism according to another embodiment.

As illustrated in FIG. 25, a support column 55a is provided which supports the seat 5 and through which the rotation shaft 55 of the seat 5 passes. The support column 55a is not limited to a single rod, but may be a flat rotary bearing, for example. As an example of the rotary bearing, the technology of Japanese Patent Laid-Open No. 2008-213827 (U.S. Patent Application Publication No. 2008/0191534) may be applied.

In the present embodiment, it is described that the first seat 52 and the second seat 53a are disposed along the advancing direction of the wheels 3, but the terms "first", "second", and the like are used for better understanding, and do not limit positions, shapes, or the like. Therefore, as illustrated in FIG. 24, the first seat 52 and the second seat 53a are disposed along the rotation axis direction of the wheels 3, and the armrest 60 is disposed between the first seat 52 and the second seat 53a. The first seat 52 (for example, the driver's seat) on which the first occupant is seated has a first backrest 512 and a first seat surface 512f, and the second seat 53a (for example, the passenger's seat) on which the second occupant is seated has a second backrest 513a and a second seat surface 513f.

The armrest 60 is not moved with the rotation of the seat 5, and the touchscreen 62 is disposed at a position away from the position of the rotation shaft 55 of the seat 5 in the advancing direction of the wheels 3 in the armrest 60. Consequently, a comfortable operation on the touchscreen 62 can be performed according to an orientation of the seat 5.

Figure 26:
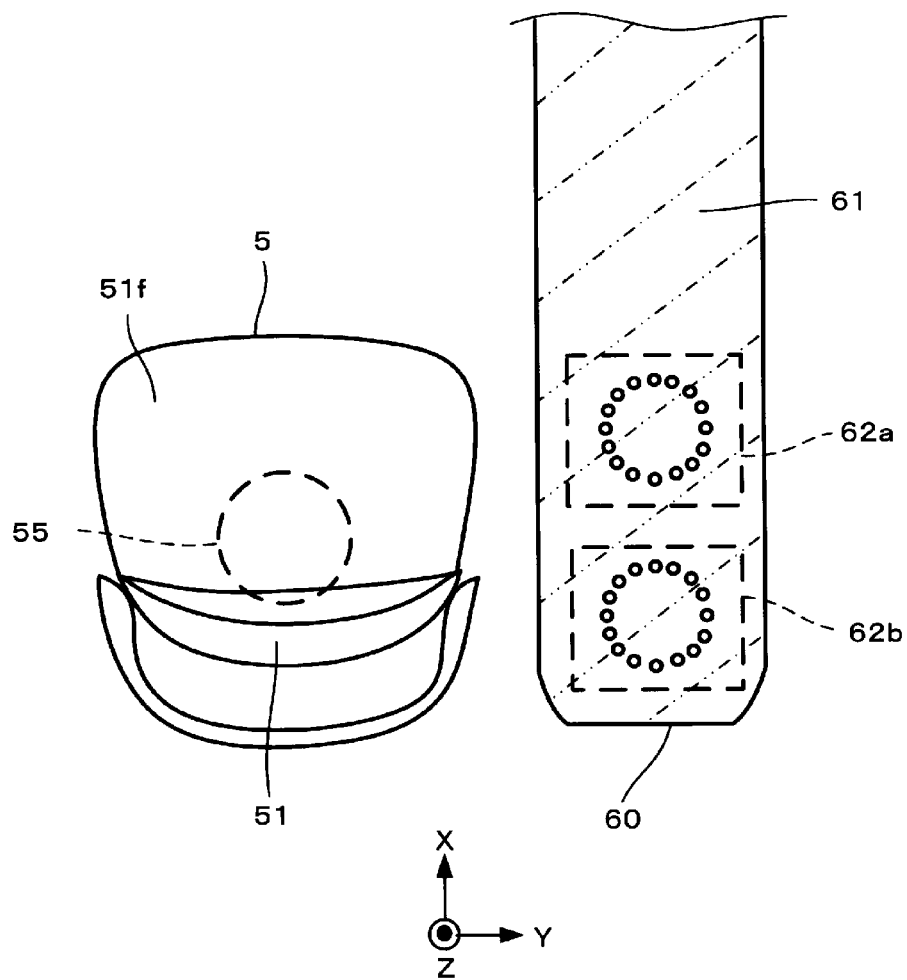
FIG. 26 is a schematic diagram illustrating examples of a seat and a touchscreen according to another embodiment.
Figure 27A:
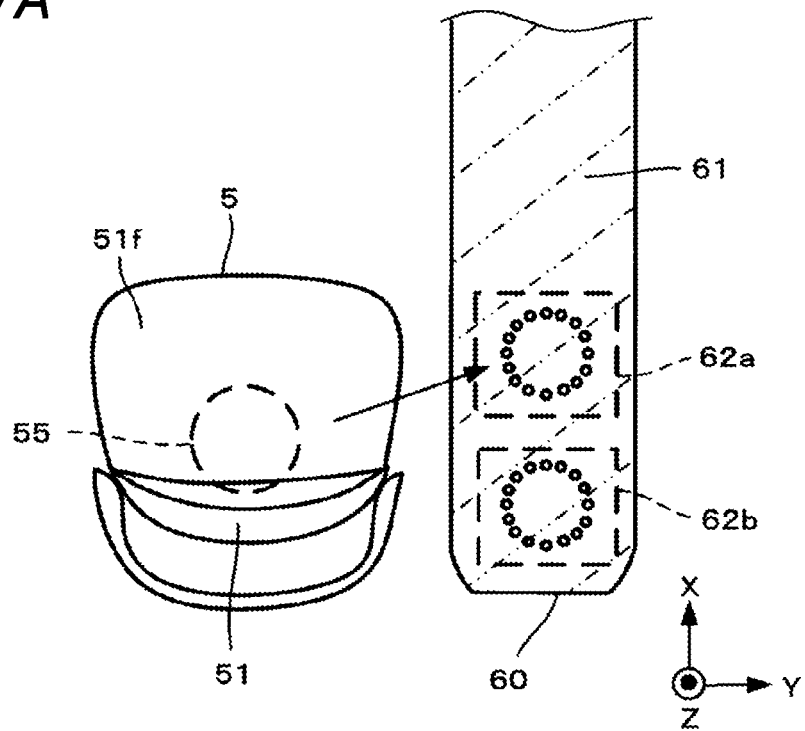
FIGS. 27A and 27B are schematic diagrams illustrating a relationship between the seat and the touchscreen in FIG. 26.
Figure 27B:
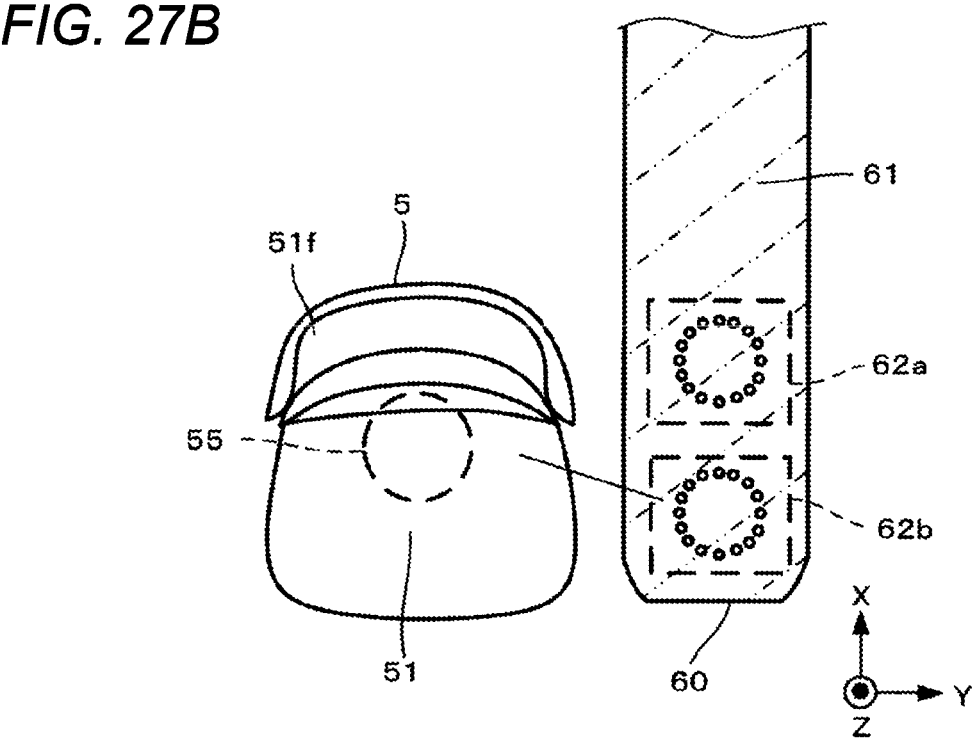

In the previous embodiment (refer to FIG. 16), a description has been made of a case where the first armrest 60a is provided with the first touchscreen 62a, and the second armrest 60b is provided with the second touchscreen 62b. In the present embodiment, as illustrated in FIG. 26, the single armrest 60 is provided with two touchscreens 62 such as the first touchscreen 62a and the second touchscreen 62b.

The first touchscreen 62a and the second touchscreen 62b are disposed at positions away from the position of the rotation shaft 55 of the seat 5 in the advancing direction (X direction) of the wheels 3 in the armrest 60. As a result, the second touchscreen 62b is not wrongly operated during an operation of the first touchscreen 62a, and the functionality is excellent.

The second touchscreen 62b is disposed at a position opposite to the first touchscreen 62a in the advancing direction of the wheels 3 with respect to the position of the rotation shaft 55 of the seat 5 in the armrest 60. As a result, each of the touchscreens 62a and 62b can be operated depending on a rotation direction of the seat 5.

With respect to rotation of the seat 5, the first touchscreen 62a can be used in a first state, and the second touchscreen 62b can be used in a second state. The first state is, for example, the business mode illustrated in FIG. 27A in which the first occupant is directed forward, and the second state is, for example, the living mode illustrated in FIG. 27B in which the first occupant faces the third occupant. As a result, the touchscreen 62 can be operated regardless of a position of the occupant.

In the present embodiment, it has been described that the first backrest 512 of the first seat 52 and the second backrest 513a of the second seat 53a are not required to face each other such that the first occupant on the first seat 52 and the second occupant on the second seat 53a directly face each other, and may face each other such that the occupants face each other to be able to have a conversation or a meeting. Here, a relationship between the seat 5 and a rotation angle will be described.

In a case of the first state, the backrest 51 of the seat 5 is directed in a first orientation B1 with respect to the advancing direction of the wheels 3, and, in a case of the second state, the backrest 51 of the seat 5 is directed in a second orientation B2 different from the first orientation with respect to the advancing direction of the wheels 3.

Figure 28A:
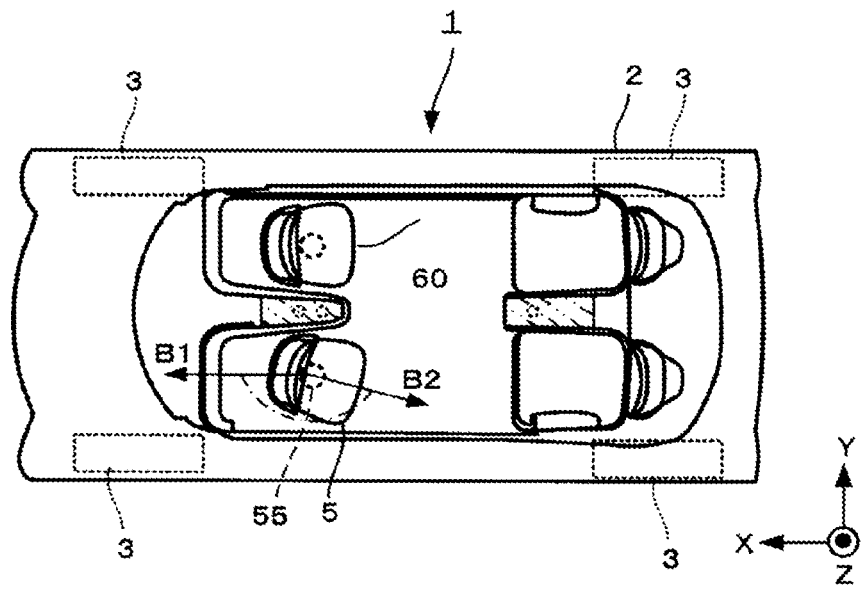
Figure 28B:
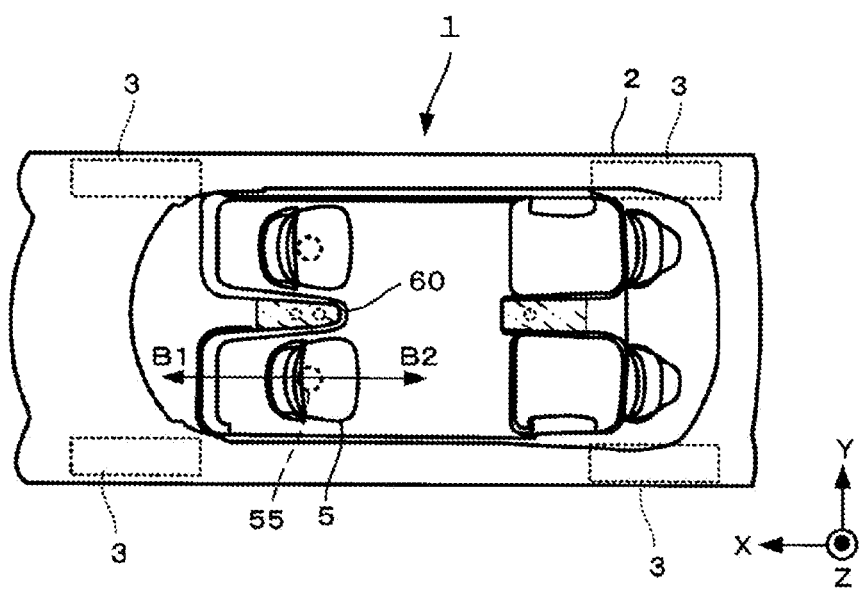

In a case where the first orientation B1 and the second orientation B2 are different from each other by any angle between 90 degrees and 180 degrees as illustrated in FIG. 28A, the occupants face each other such that the occupants can have a conversation or a meeting at the angle. In a case where the first orientation B1 and the second orientation B2 are different from each other by 180 degrees as illustrated in FIG. 28B, the occupants are in a state of facing each other directly.

Figure 29:
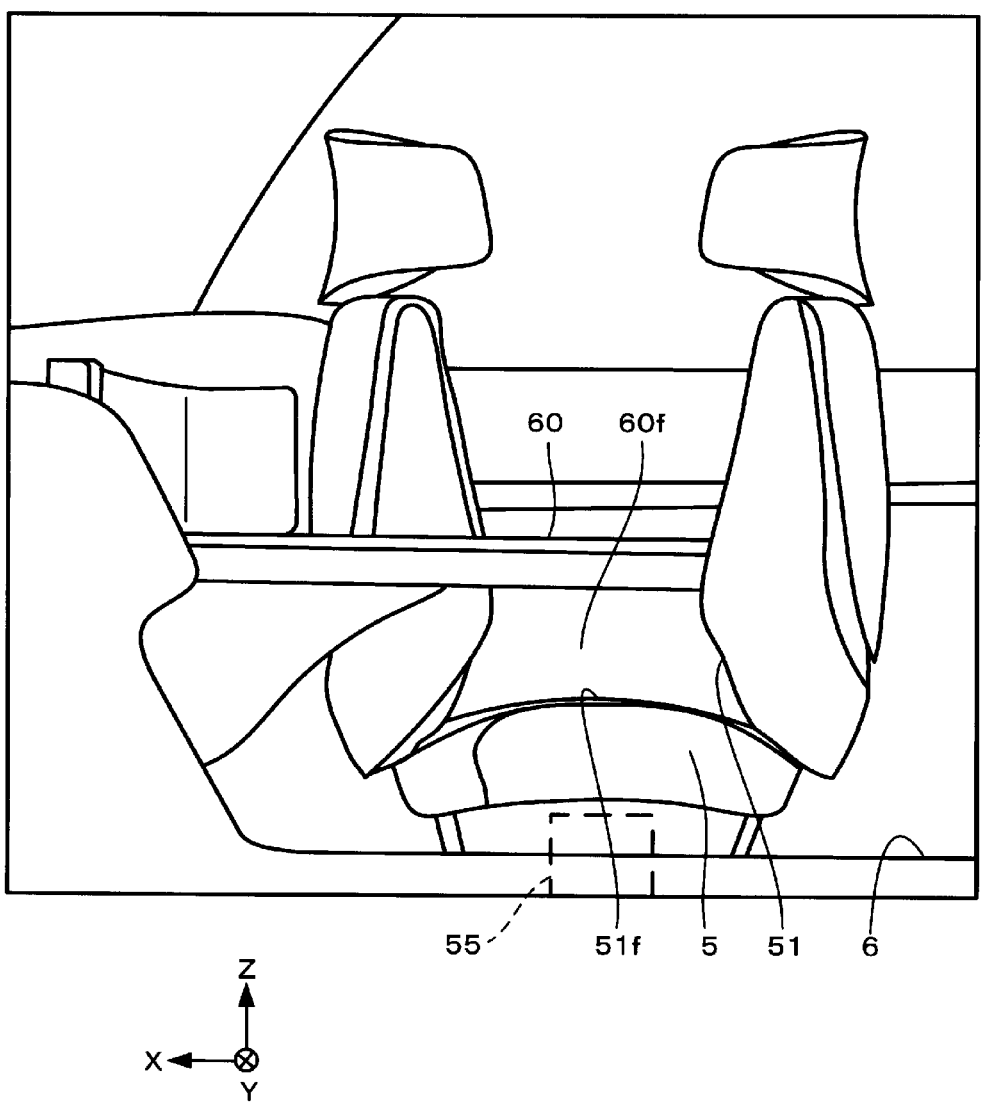
FIG. 29 is a schematic diagram illustrating an example of a hollow part of an armrest according to another embodiment.
Figure 30:
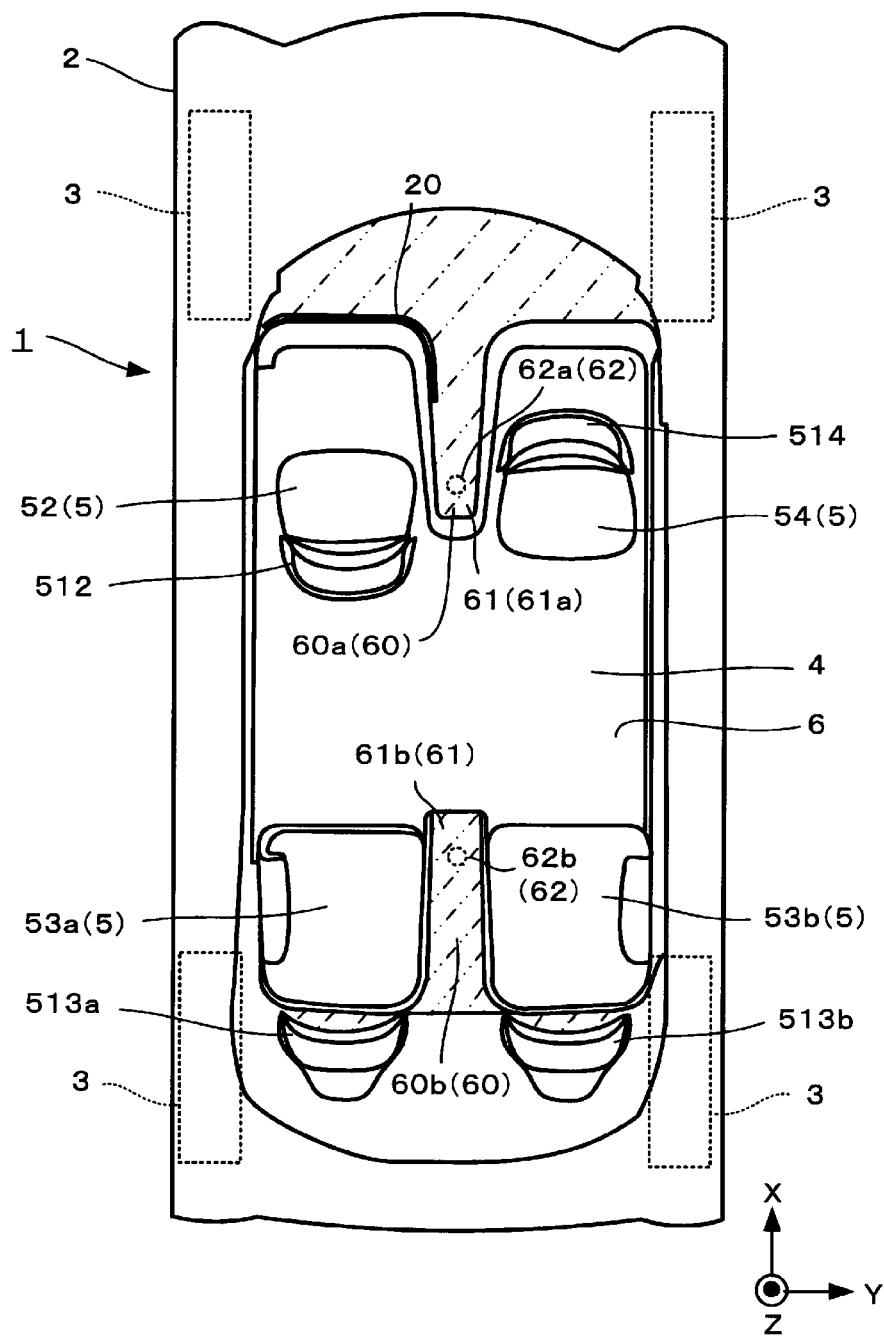
FIG. 30 is a plan view of a vehicle cabin of a vehicle according to still another embodiment.

It has been described that the seat 5 is defined to be rotatable about the rotation shaft 55 along a direction perpendicular to a plane formed by the advancing direction of the wheels 3 and the rotation axis direction of the wheels 3. As illustrated in FIG. 29, a "plane formed" by the advancing direction (X direction) of the wheels 3 and the rotation axis direction (Y direction) of the wheel 3 is defined, and the floor surface (floor) 6 is disposed along the formed plane. The seat 5 is rotatable, and a hollow portion 60f, which is hollow, is formed between at least a part of the armrest 60 and the floor 6. The presence of the hollow portion 60f enables the occupant to smoothly rotate without hitting the occupant's knees or feet against the armrest 60 during rotation.

Further still another embodiment will be described in detail with reference to FIGS. 30 to 33. Since fundamental positional relationships of the seat 5, the armrest 60, and the like of the vehicle 1 are the same as those in the present embodiment, description will be omitted except for different configurations.

Figure 31A:
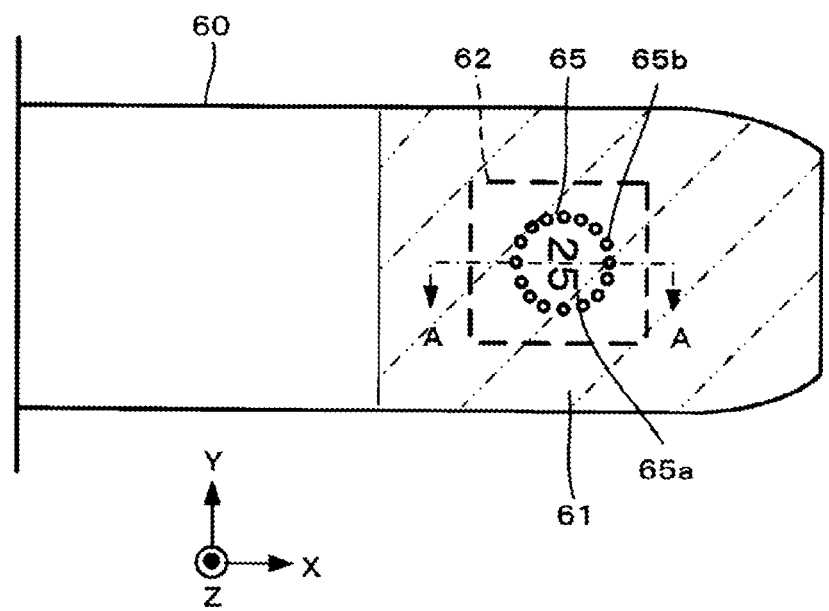
Figure 31B:
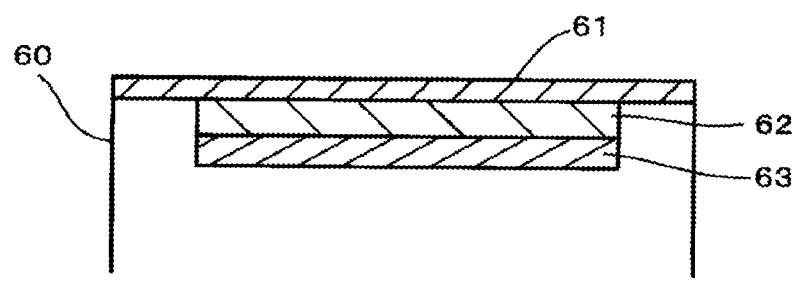

In the present embodiment, as illustrated in FIGS. 31A and 31B, the touchscreen 62 is defined to be able to detect a position of the occupant's finger along a predetermined plane formed by advancing direction (X direction) of the wheels 3 and the rotation axis direction (Y direction) of the wheels 3. As a result, the occupant's operation on the touchscreen 62 becomes smooth.

The designability is improved by restricting an area covered by the cover 61.

As illustrated in FIG. 31A, the cover 61 covers the entire surfaces of the light emitting device 63 and the touchscreen 62, and also covers at least 50% of the upper surface of the armrest 60. As a result, a unified design feeling can be achieved in the vehicle cabin 4, and a comfortable space of the vehicle cabin 4 can be provided.

Figure 32:
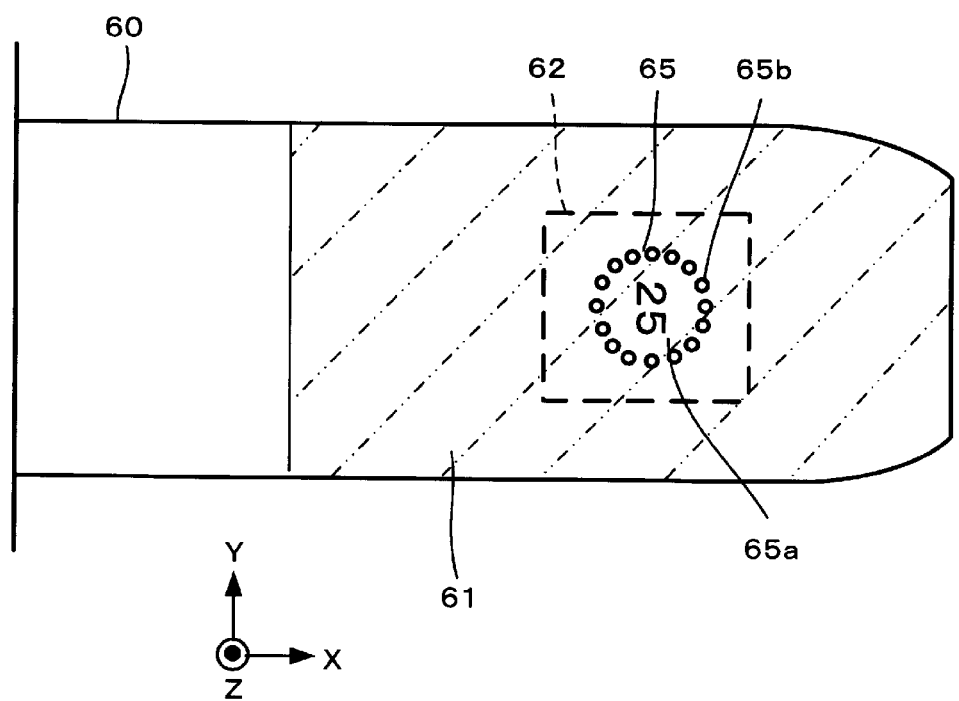
FIG. 32 is a schematic diagram illustrating a state in which the area of the cover according to still another embodiment is 80%.

The cover 61 may cover at least 80% of the upper surface of the armrest 60, as illustrated in FIG. 32. As a result, a unified design feeling can be achieved in the vehicle cabin 4, and a comfortable space of the vehicle cabin 4 can be provided.

The cover 61 has, for example, a woodgrain or a carbon fiber tone or has a real wood pattern, and covers the light emitting device 63, the touchscreen 62, and the armrest 60 such that the pattern is continued.

In the present embodiment, the light emitting device 63 has been described as a liquid crystal panel, an organic electroluminescence (EL), a micro light emitting diode (LED), or the like. As another example of the light emitting device 63, the light emitting device 63 may be a display circuit. For example, the display circuit may have an LCD and a backlight, and may be an organic EL display circuit.

At least a part of the periphery of the seat 5 may be further provided with a panel 64 disposed along the rotation axis direction of the wheels 3, and the cover 61 may have a continuous pattern. The cover covers the light emitting device 63, the touchscreen 62, the armrest 60, and the panel 64. As a result, a unified design feeling in the vehicle cabin 4 can be achieved.

A description has been made of a case where the first armrest 60a is disposed along the advancing direction of the wheels 3 in at least a part of the periphery of the first seat 52, and the second armrest 60b is disposed along the advancing direction of the wheels 3 in at least a part of the periphery of the second seat 53a.

Figure 33:
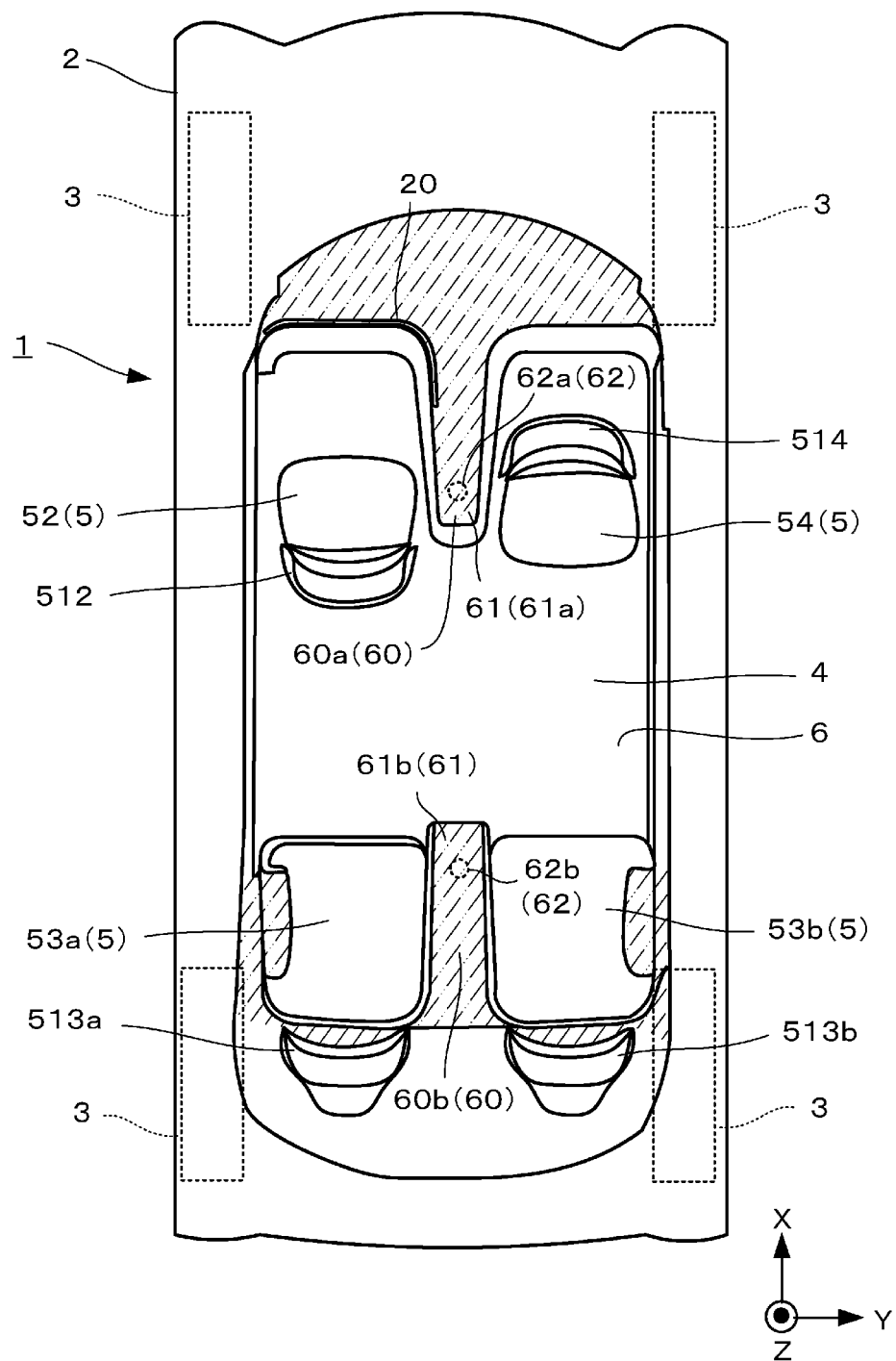
FIG. 33 is a plan view of a vehicle cabin of a vehicle according to further still another embodiment.

Here, as illustrated in FIG. 33, the armrest 60 disposed on the center side in the rear seat will be referred to as a first armrest 60a. With respect to the seat 5, the armrest 60 that is disposed along the advancing direction (X direction) of the wheels 3 and on which a part of the arm of the occupant can be placed in at least a part of the periphery of the seat 5 at a position opposite to the first armrest 60a will be referred to as a second armrest 60b.

The cover 61 covers the light emitting device 63, the touchscreen 62, the first armrest 60a, the panel 64, and the second armrest 60b such that the pattern is continued. As a result, a more unified design feeling can be achieved in the vehicle cabin 4, and a comfortable environment can be provided.

As described above, the vehicle 1 according to the present embodiment includes the vehicle body 2 that has the vehicle cabin 4, at least one wheel 3 that is disposed along a predetermined one direction (X direction) in the vehicle body 2, the seat 5 that is disposed inside the vehicle cabin 4, the first planar member 7 that is fixed to the vehicle body 2, separates the vehicle cabin 4 from the outside of the vehicle, is disposed further toward the outside of the vehicle than the seat 5 in the predetermined one direction, and has a first transmittance for visible light, the second planar member 10 that can be disposed between the first planar member 7 and the seat 5, and has a second transmittance for visible light that is smaller than the first transmittance, and the input device 20. In the vehicle 1, the second planar member 10 is disposed between the first planar member 7 and the seat 5 in a case where a predetermined input is performed on the input device 20.

As a result, the visible light is blocked by the second planar member, and the glare due to the scenery outside the vehicle or the visible light incident from the outside of the vehicle can be reduced, and work or a TV conference can be performed in a comfortable environment toward the second planar member.

As described above, in the vehicle 1 according to the present embodiment, the vehicle body 2 includes the lighting 8, and the lighting 8 applies light in the predetermined one direction. As a result, the vehicle 1 can travel safely.

As described above, in the vehicle 1 according to the present embodiment, the vehicle body 2 further includes the plurality of lightings 9, and the lighting 8 that applies light in the predetermined one direction can apply stronger light than each of the plurality of lightings 9. As a result, the vehicle 1 can travel safely.

As described above, the vehicle 1 of the present embodiment includes the movement mechanism 14 that moves the second planar member 10. In a case where a predetermined input is performed on the input device 20, the second planar member 10 is disposed between the first planar member 7 and the seat 5 by the movement mechanism 14. As a result, work or the like can be automatically performed toward the second planar member 10.

As described above, the vehicle 1 of the present embodiment includes the storage 30 that can store the second planar member 10, and at least a part of the second planar member 10 is exposed from the storage 30 in a case where a predetermined input is performed on the input device 20. As a result, the second planar member 10 is reliably exposed to a predetermined position without being hindered by vibration or the like during traveling.

As described above, the vehicle 1 according to the present embodiment further includes the controller 210, and, in a case where a predetermined input is performed on the input device 20, the controller 210 performs control such that the second planar member 10 is disposed between the first planar member 7 and the seat 5. As a result, the second planar member 10 is automatically disposed at a predetermined position.

As described above, in the vehicle 1 of the present embodiment, the input device 20 can receive the occupant's input of the vehicle 1. This facilitates the occupant's input.

As described above, in the vehicle 1 of the present embodiment, the input device 20 includes the operation device 212, and the operation device 212 can receive the occupant's operation. As a result, the occupant's operation is facilitated.

As described above, in the vehicle 1 according to the present embodiment, the seat 5 includes the rotation shaft 55, and, in a case where the seat 5 is rotated about the rotation shaft 55 by a predetermined angle, the second planar member 10 is disposed between the first planar member 7 and the seat 5. As a result, the second planar member 10 is automatically disposed at a predetermined position due to rotation of the seat.

As described above, in the vehicle 1 according to the present embodiment, the vehicle cabin 4 includes the floor surface 6, and the rotation shaft 55 of the seat 5 is perpendicular to the floor surface 6. As a result, the seat can be safely rotated.

As described above, in the vehicle 1 of the present embodiment, the seat 5 is the first seat 52, the vehicle further includes the second seat 53, and the second seat 53 and the first seat 52 are disposed along the predetermined one direction. As a result, a positional relationship between the first seat 52 and the second seat 53 is stabilized.

As described above, in the vehicle 1 according to the present embodiment, the backrest 512 of the first seat 52 and the backrest 513 of the second seat 53 can face each other. As a result, the living mode can be realized.

As described above, in the vehicle 1 of the present embodiment, the backrest 512 of the first seat 52 and the backrest 513 of the second seat 53 can be directed in the same direction. As a result, the business mode can be realized.

As described above, the vehicle 1 according to the present embodiment includes the seat 5 as the first seat 52, and further includes the third seat 54. The first seat 52 and the third seat 54 are disposed along a direction perpendicular to the predetermined one direction. As a result, a positional relationship between the first seat 52 and the third seat 54 is stabilized.

As described above, in the vehicle 1 of the present embodiment, at least a part of the second planar member 10 can be disposed between the first seat 52 and the third seat 54. As a result, the first seat 52 and the third seat 54 can be partitioned, and thus the occupant on the first seat 52 can concentrate on work and the like.

As described above, in the vehicle 1 according to the present embodiment, at least a part of the second planar member 10 has the curved surface 12c. As a result, designability of the second planar member 10 can be improved, and thus a comfortable environment can be provided to an occupant.

As described above, the vehicle 1 of the present embodiment includes the display device 13 on the surface of the second planar member 10 on the seat 5 side. As a result, a TV conference, a TV conversation, information input, and the like can be performed, and thus work efficiency is improved.

As described above, in the vehicle 1 according to the present embodiment, the display device 13 has a rectangular shape, and the long side direction of the rectangular shape is along the direction perpendicular to the predetermined one direction. As a result, a lot of information and the like can be displayed, and thus the occupant on the first seat 52 can easily view the display device 13 and can easily perform work.

As described above, in the vehicle 1 according to the present embodiment, the display device 13 can display an image. As a result, a width of a content that can be displayed is increased, and thus various pieces of work and content display are facilitated.

As described above, the vehicle 1 according to the present embodiment can perform autonomous traveling. As a result, the living mode and the business mode can be realized safely and securely even while the vehicle 1 is traveling.

As described above, the vehicle 1 according to the present embodiment includes one or more rotatable wheels 3, the first seat 52 on which the first occupant can be seated, the second seat 53a on which the second occupant can be seated, the first armrest 60a that is disposed along the advancing direction of the wheels 3 in at least a part of the periphery of the first seat 52 and on which at least a part of the arm of the first occupant can be placed, the second armrest 60b that is disposed along the advancing direction of the wheels 3 in at least a part of the periphery of the second seat 53a and on which at least a part of the arm of the second occupant can be placed, the first touchscreen 62a that is disposed inside the first armrest 60a, the second touchscreen 62b that is disposed inside the second armrest 60b, the first cover 61a that is disposed to overlap the first touchscreen 62a and covers at least a part of the first armrest 60a, and the second cover 61b that is disposed to overlap the second touchscreen 62b and covers at least a part of the second armrest 60b. In the vehicle 1, the first seat 52 and the second seat 53a are disposed along the advancing direction of the wheels 3, the first backrest 512 of the first seat 52 and the second backrest 513 of the second seat 53a can be disposed to face each other, and, in a case where at least the first backrest 512 of the first seat 52 and the second backrest 513 of the second seat 53a are disposed to face each other, the first touchscreen 62a can receive input for at least an item of the vehicle 1, and the second touchscreen 62b can receive input for at least the item of the vehicle 1.

As a result, since the touchscreens are respectively provided in the armrests on which the arms can be placed around the seats of the facing occupants, the facing occupants can input various items of the vehicle, and thus the comfort in the living mode is improved.

As described above, the vehicle 1 of the present embodiment further includes the third seat 54 on which the third occupant can be seated and the fourth seat 53b on which the fourth occupant can be seated, and the third seat 54 and the fourth seat 53b are disposed along the advancing direction of the wheels 3, the first seat 52 and the third seat 54 are disposed along the rotation axis direction of the wheels 3, the second seat 53a and the fourth seat 53b are disposed along the rotation axis direction of the wheels 3, at least a part of the first armrest 60a is disposed between the first seat 52 and the third seat 54, and at least a part of the second armrest 60b is disposed between the second seat 53a and the fourth seat 53b. As a result, the third occupant and the fourth occupant who face each other can also input various items of the vehicle, and thus the comfort in the living mode is improved.

As described above, the vehicle 1 according to the present embodiment further includes the first light emitting device 63a that is disposed inside the first armrest 60a and can emit predetermined light, and second light emitting device 63b that is disposed inside the second armrest 60b and can emit predetermined light, and the first cover 61a is disposed to overlap the first light emitting device 63a and the first touchscreen 62a and has a predetermined transmittance for predetermined light, and the second cover 61b is disposed to overlap the second light emitting device 63b and the second touchscreen 62b and has a predetermined transmittance for predetermined light. As a result, a comfortable operation is possible while improving the designability.

As described above, in the vehicle 1 of the present embodiment, the item of the vehicle 1 is temperature setting in air conditioning of the vehicle 1. As a result, the temperature of the vehicle cabin can be appropriately set through a simple operation.

As described above, the vehicle 1 of the present embodiment further includes the display device 13, and the item of the vehicle 1 is two-dimensional coordinates of the display device 13. As a result, the display device can be operated through a simple operation.

As described above, in the vehicle 1 according to the present embodiment, the two-dimensional coordinates are displayed as the pointer 70*a* on the display device 13. As a result, the display device can be intuitively operated.

As described above, the vehicle 1 of the present embodiment further includes the display device 13, and, in a case where the display device 13 is displaying the content 70*b*, the item of the vehicle 1 is scrolling of the content 70*b* in the vertical direction and/or the horizontal direction. As a result, the content can be moved through a simple operation.

As described above, in the vehicle 1 of the present embodiment, the display device 13 is disposed between the first seat 52 and the second seat 53*a*. As a result, the facing occupants can visually recognize the display device, and the comfort in the living mode is improved.

As described above, in the vehicle 1 of the present embodiment, the display device 13 is disposed on the side surface inside the vehicle 1. As a result, the facing occupants can easily visually recognize the display device, and the comfort in the living mode is improved.

As described above, the vehicle 1 of the present embodiment further includes the sound output device 71, and the item of the vehicle 1 is changing of a volume of sound emitted from the sound output device 71. As a result, the volume can be properly set through a simple operation.

As described above, the vehicle 1 of the present embodiment further includes the sound output device 71, and the sound output device 71 can output an audio content, and the item of the vehicle 1 is fast forwarding and/or fast rewinding of the audio content. As a result, the audio content can be operated through a simple operation.

As described above, in the vehicle 1 of the present embodiment, in a case where at least the first backrest 512 of the first seat 52 and the second backrest 513 of the second seat 53*a* are disposed to face each other, the first input A1 on the first touchscreen 62*a* in a predetermined orientation along the advancing direction and the second input A2 on the second touchscreen 62*b* in the predetermined orientation along the advancing direction have the same meaning. As a result, the facing occupants can share input in the same direction.

As described above, in the vehicle 1 of the present embodiment, in a case where at least the first backrest 512 of the first seat 52 and the second backrest 513 of the second seat 53*a* are disposed to face each other, the third input A3 on the first touchscreen 62*a* in the first orientation along the advancing direction and the fourth input A4 on the second touchscreen 62*b* in the second orientation opposite to the first orientation along the advancing direction have the same meaning. As a result, the facing occupants can perform input in directions respectively specific thereto.

As described above, in the vehicle 1 of the present embodiment, in a case where at least the first backrest 512 of the first seat 52 and the second backrest 513 of the second seat 53*a* are disposed to face each other, the fifth input A5 on the first touchscreen 62*a* in a predetermined orientation along the rotation axis direction of the wheels 3 and the sixth input A6 on the second touchscreen 62*b* in the predetermined orientation along the rotation axis direction of the wheels 3 have the same meaning. As a result, the facing occupants can share input in the same direction.

As described above, in the vehicle 1 of the present embodiment, in a case where at least the first backrest 512 of the first seat 52 and the second backrest 513 of the second seat 53*a* are disposed to face each other, the seventh input A7 on the first touchscreen 62*a* in the third orientation along the rotation axis direction of the wheels 3 and the eighth input A8 on the second touchscreen 62*b* in the fourth direction opposite to the third orientation along the rotation axis direction of the wheels 3 have the same meaning. As a result, the facing occupants can perform input in directions respectively specific thereto.

As described above, in the vehicle 1 of the present embodiment, in a case where at least the first backrest 512 of the first seat 52 and the second backrest 513 of the second seat 53*a* are disposed to face each other, the clockwise ninth input A9 on the first touchscreen 62*a* and the clockwise tenth input A10 on the second touchscreen 62*b* have the same meaning. As a result, the facing occupants can easily perform operation input.

As described above, the vehicle 1 of the present embodiment has one or more rotatable wheels 3, the seat 5 on which an occupant can be seated, the armrest 60 that is disposed along the advancing direction of the wheels 3 in at least a part of the periphery of the seat 5 and on which at least a part of the arm of the occupant can be placed, the touchscreen 62 that is disposed inside the armrest 60, and the cover 61 that is disposed to overlap the touchscreen 62 and covers at least a part of the armrest 60, in which the seat 5 is rotatable about the rotation shaft 55 along a direction perpendicular to a plane formed by the advancing direction of the wheels 3 and the rotation axis direction of the wheels 3, the armrest 60 is not moved with rotation of the seat 5, and the touchscreen 62 is disposed at a position away from the position of the rotation shaft 55 of the seat 5 in the advancing direction in the armrest 60.

As a result, since the touchscreen is disposed at a position away from the position of the rotation shaft of the seat in the advancing direction in the armrest, the occupant can perform various operations on the vehicle even though the seat is rotated.

As described above, in the vehicle 1 of the present embodiment, the touchscreen 62 includes the first touchscreen 62*a* and the second touchscreen 62*b*, and the first touchscreen 62*a* and the second touchscreen 62*b* are disposed at positions away from the position of the rotation shaft 55 of the seat 5 in the advancing direction in the armrest 60. As a result, the second touchscreen is not wrongly operated during an operation of the first touchscreen, and the functionality is excellent.

As described above, in the vehicle 1 of the present embodiment, the second touchscreen 62*b* is disposed at a position opposite to the first touchscreen 62*a* in the advancing direction with respect to the position of the rotation shaft 55 of the seat 5 in the armrest 60. As a result, each touchscreen can be operated depending on a rotation direction of the seat.

As described above, in the vehicle 1 according to the present embodiment, with respect to rotation of the seat 5, the first touchscreen 62*a* can be used in the first state, and the second touchscreen 62*b* can be used in the second state. As a result, the touchscreen can be operated regardless of a position of the occupant.

As described above, in the vehicle 1 of the present embodiment, the seat 5 has the seat surface 51*f* and the backrest 51, and, in a case of the first state, the backrest 51 of the seat 5 is directed in the first orientation in the advancing direction, and, in a case of the second state, the backrest 51 of the seat 5 is directed in the second orientation different from the first orientation in the advancing direction. As a result, it is possible to realize a state in which the occupants face each other such that the occupants can have a conversation or a meeting.

As described above, in the vehicle 1 of the present embodiment, the first orientation and the second orientation are different from each other by any angle between 90 degrees and 180 degrees. As a result, the occupants can have a conversation or a meeting.

As described above, in the vehicle 1 of the present embodiment, the first orientation and the second orientation are different from each other by 180 degrees. As a result, it is possible to realize a state in which the occupant faces each other directly.

As described above, in the vehicle 1 of the present embodiment, the seat surface 51*f* of the seat 5 and the backrest 51 of the seat 5 can be fixed. As a result, the backrest can be fixed even though the seat is rotated.

As described above, the vehicle 1 of the present embodiment has the support column 55*a* that supports the seat 5 and through which the rotation shaft 55 of the seat 5 passes. As a result, the seat 5 can be stably rotated.

As described above, in the vehicle 1 of the present embodiment, the armrest 60 is fixed to the vehicle 1. As a result, the occupant can operate the touchscreen of the armrest at a predetermined position.

As described above, the vehicle 1 according to the present embodiment includes the floor 6 disposed along a plane formed by the advancing direction of the wheels 3 and the rotation axis direction of the wheels 3, and a space between at least a part of the armrest 60 and the floor 6 is hollow. As a result, the occupant can smoothly rotate without hitting the occupant's knees or feet against the armrests during rotation.

As described above, in the vehicle 1 of the present embodiment, the occupant is the first occupant, the seat 5 is the first seat 52, and the vehicle further includes the second seat 53*a* on which the second occupant can be seated, and the first seat 52 and the second seat 53*a* are disposed along the rotation axis direction of the wheels 3, and the armrest 60 is disposed between the first seat 52 and the second seat 53*a*. As a result, the first occupant and the second occupant can use the armrest.

As described above, in the vehicle 1 of the present embodiment, one or more rotatable wheels 3, at least one seat 5 on which an occupant can be seated, the armrest 60 that is disposed along the advancing direction of the wheels 3 in at least a part of the periphery of the seat 5 and on which at least a part of the occupant's arm can be placed, the light emitting device 63 that is disposed inside the armrest 60 and can emit predetermined light, the touchscreen 62 that is disposed to overlap the light emitting device 63 in the armrest 60, and the cover 61 that is disposed to overlap the light emitting device 63 and the touchscreen 62, has a predetermined transmittance for predetermined light, and covers at least a part of the armrest 60. In the vehicle 1, the touchscreen 62 can detect a position of the occupant's finger along a predetermined plane formed by the advancing direction of the wheels 3 and the rotation axis direction of the wheels 3, and the cover 61 covers the entire surface of the light emitting device 63 and the touchscreen 62 and also covers at least 50% of the upper surface of the armrest 60.

As a result, the cover covers the entire surface of the light emitting device and the touchscreen and also covers at least 50% of the upper surface of the armrest, so that a unified design feeling is improved.

As described above, in the vehicle 1 of the present embodiment, the cover 61 covers at least 80% of the upper surface of the armrest 60. As a result, a unified design feeling is further improved.

As described above, in the vehicle 1 of the present embodiment, the cover 61 has a pattern, and the cover 61 covers the light emitting device 63, the touchscreen 62, and the armrest 60 such that the pattern is continued. As a result, the designability is improved.

As described above, the vehicle 1 of the present embodiment further includes the panel 64 disposed along the rotation axis direction of the wheels 3 in at least a part of the periphery of the seat 5, and the cover 61 covers the light emitting device 63, the touchscreen 62, the armrest 60, and the panel 64 such that the pattern is continued. As a result, designability and a unified design feeling are improved.

As described above, in the vehicle 1 of the present embodiment, the armrest 60 is the first armrest 60*a*, and the vehicle further includes the second armrest 60*b* that is along the advancing direction of the wheels 3 and on which at least a part of the seat 5 can be placed, at a position opposite to the first armrest 60*a* with respect to the seat 5, and the cover 61 covers the light emitting device 63, the touchscreen 62, the first armrest 60*a*, the panel 64, and the second armrest 60*b* such that the pattern is continued. As a result, designability and a unified design feeling are improved.

As described above, in the vehicle 1 of the present embodiment, the pattern is a woodgrain. As a result, high quality design is achieved.

As described above, in the vehicle 1 according to the present embodiment, the light emitting device 63 is a display circuit. As a result, the light emitting device can be made to have a display function.

As described above, in the vehicle 1 of the present embodiment, the display circuit has the LCD and the backlight. As a result, the light emitting device can be made to have a display function.

As described above, in the vehicle 1 of the present embodiment, the display circuit is the organic EL display circuit. As a result, the light emitting device can be made to have a display function.

As described above, in the vehicle 1 of the present embodiment, the touchscreen 62 is disposed between the light emitting device 63 and the cover 61. As a result, high operability can be realized without impairing the designability.

The present disclosure includes the following contents.

[A1]

A vehicle including:

a vehicle body that includes a vehicle cabin;

at least one wheel that is disposed along a predetermined one direction in the vehicle body;

a seat that is disposed inside the vehicle cabin;

a first planar member that is fixed to the vehicle body, separates the vehicle cabin from an outside of the vehicle, is disposed further toward the outside of the vehicle than the seat in the predetermined one direction, and has a first transmittance for visible light;

a second planar member that is allowed to be disposed between the first planar member and the seat, and has a second transmittance for visible light that is smaller than the first transmittance; and an input device, in which the second planar member is disposed between the first planar member and the seat in a case where a predetermined input is performed on the input device.

[A2]

The vehicle according to the above [A1], in which the vehicle body includes at least one lighting, in which the at least one lighting includes a first lighting that applies light in the predetermined one direction.

[A3]

The vehicle according to the above [A2], in which the at least one lighting is a plurality of lightings comprising the first lighting, and in which the first lighting is configured to apply light stronger than that of others of the plurality of lightings.

[A4]

The vehicle according to the above [A1], further including:

a movement mechanism that moves the second planar member, in which, in a case where the predetermined input is performed on the input device, the second planar member is disposed between the first planar member and the seat by the movement mechanism.

[A5]

The vehicle according to the above [A4], further including:

a storage that can store the second planar member, in which, in a case where the predetermined input is performed on the input device, at least a part of the second planar member is exposed from the storage.

[A6]

The vehicle according to the above [A1], in which the vehicle cabin includes an in-vehicle lighting that illuminates at least a seat surface of the seat, in which, in a case where the predetermined input is performed on the input device, the second planar member is brought into a predetermined state in which the second planar member is disposed between the first planar member and the seat, in which, in a case where the second planar member is in the predetermined state, the in-vehicle lighting sets an illuminance on the seat surface of the seat to a first illuminance, and in which, in a case where the second planar member is not in the predetermined state, the in-vehicle lighting sets the illuminance on the seat surface of the seat to a second illuminance lower than the first illuminance.

[A7]

The vehicle according to the above [A1], further including:

a controller, in which, in a case where the predetermined input is performed on the input device, the controller performs control such that the second planar member is disposed between the first planar member and the seat.

[A8]

The vehicle according to the above [A1], in which the input device is configured to receive an input from the occupant of the vehicle.

[A9]

The vehicle according to the above [A8], in which the input device includes an operation device, and in which the operation device is configured to receive an operation from the occupant.

[A10]

The vehicle according to the above [A8], in which the seat includes a rotation shaft, in which, in a case where the seat is rotated about the rotation shaft by a predetermined angle, the second planar member is disposed between the first planar member and the seat.

[A11]

The vehicle according to the above [A10], in which the vehicle cabin includes a floor surface, and in which the rotation shaft of the seat extends in a direction perpendicular to the floor surface.

[A12]

The vehicle according to the above [A1], in which the seat is a first seat, in which the vehicle further includes a second seat, and in which the second seat and the first seat are disposed along the predetermined one direction.

[A13]

The vehicle according to the above [A12], in which a backrest of the first seat and a backrest of the second seat are allowed to face each other.

[A14]

The vehicle according to the above [A13], in which the backrest of the first seat and the backrest of the second seat are allowed to be directed in a same direction.

[A15]

The vehicle according to the above [A14], in which in at least a case where the backrest of the first seat and the backrest of the second seat are in a facing state, a movable range of the backrest of the first seat is restricted.

[A16]

The vehicle according to the above [A14], in which in at least a case where the backrest of the first seat and the backrest of the second seat are in a facing state, the backrest of the first seat is disposed to overlap the second planar member in a direction perpendicular to the floor surface of the vehicle cabin.

[A17]

The vehicle according to the above [A16], in which in at least a case where the backrest of the first seat and the backrest of the second seat are in a facing state, at least a part of the second planar member is stored in a storage configured to store the second planar member.

[A18]

The vehicle according to the above [A14], in which a movable range of the backrest of the first seat is restricted while the first seat and the second seat transition between a facing state and a state of being directed in the same direction.

[A19]

The vehicle according to the above [A14], in which, in a case where the first seat and the second seat are in a facing state, the second planar member is controlled not to be disposed between the first planar member and the first seat.

[A20]

The vehicle according to the above [A1], in which the seat is a first seat, in which the vehicle further includes a third seat, and in which the first seat and the third seat are disposed along a direction perpendicular to the predetermined one direction.

[A21]

The vehicle according to the above [A20], in which at least a part of the second planar member is allowed to be disposed between the first seat and the third seat.

[A22]

The vehicle according to the above [A21], in which at least a part of the second planar member includes a curved surface.

[A23]

The vehicle according to the above [A1], further including:

a display device that is provided on a surface of the second planar member on the seat side.

[A24]

The vehicle according to the above [A23], in which the display device has rectangular shape, and in which a long side direction of the rectangular shape extends along a direction perpendicular to the predetermined one direction.

[A25]

The vehicle according to the above [A23], in which the display device is configured to display an image.

[A26]

The vehicle according to the above [A1], in which the vehicle is configured to perform autonomous traveling.

[A27]

The vehicle according to the above [A1], in which the first transmittance of the first planar member is variable in two or more steps, and, in a case where the second planar member is disposed between the first planar member and the seat, the first transmittance of the first planar member is controlled to be reduced.

[B1]

A vehicle including:

at least one rotatable wheel;

a first seat on which a first occupant can be seated, a second seat on which a second occupant can be seated;

a first armrest that is disposed along an advancing direction of the wheel in at least a part of the periphery of the first seat and on which at least a part of the arm of the first occupant can be placed;

a second armrest that is disposed along the advancing direction of the wheel in at least a part of the periphery of the second seat and on which at least a part of the arm of the second occupant can be placed;

a first touchscreen that is disposed inside the first armrest;

a second touchscreen that is disposed inside the second armrest;

a first cover that is disposed to overlap the first touchscreen and covers at least a part of the first armrest; and a second cover that is disposed to overlap the second touchscreen and covers at least a part of the second armrest, in which the first seat and the second seat are disposed along the advancing direction of the wheel, in which a first backrest of the first seat and a second backrest of the second seat can be disposed to face each other, and in which, in a case where at least the first backrest of the first seat and the second backrest of the second seat are disposed to face each other, the first touchscreen can receive input for at least an item of the vehicle, and the second touchscreen can receive input for at least the item of the vehicle.

[B2]

The vehicle according to the above [B1], further including:

a third seat on which a third occupant can be seated; and a fourth seat on which a fourth occupant can be seated, in which the third seat and the fourth seat are disposed along the advancing direction of the wheel, in which the first seat and the third seat are disposed along a rotation axis direction of the wheel, in which the second seat and the fourth seat are disposed along the rotation axis direction of the wheel, in which at least a part of the first armrest is disposed between the first seat and the third seat, and in which at least a part of the second armrest is disposed between the second seat and the fourth seat.

[B3]

The vehicle according to the above [B1] or [B2], further including:

a first light emitting device that is disposed inside the first armrest and can emit predetermined light;

a second light emitting device that is disposed inside the second armrest and can emit predetermined light;

in which the first cover is disposed to overlap the first light emitting device and the first touchscreen, and has a predetermined transmittance for the predetermined light, and in which the second cover is disposed to overlap the second light emitting device and the second touchscreen, and has a predetermined transmittance with respect to the predetermined light.

[B4]

The vehicle according to any one of the above [B1] to [B3], in which the item of the vehicle is temperature setting in air conditioning of the vehicle.

[B5]

The vehicle according to any one of the above [B1] to [B4], further including:

a display device, in which the item of the vehicle is two-dimensional coordinates of the display device.

[B6]

The vehicle according to the above [B5], wherein the two-dimensional coordinates are displayed as a pointer on the display device.

[B7]

The vehicle according to any one of the above [B1] to [B4], further including:

a display device, in which, in a case where the display device is displaying a content, the item of the vehicle is vertical scrolling of the content in the vertical direction and/or the horizontal direction.

[B8]

The vehicle according to any one of the above [B5] to [B7], in which the display device is disposed between the first seat and the second seat.

[B9]

The vehicle according to any one of the above [B5] to [B8],

The display device is disposed on a side surface inside the vehicle.

[B10]

The vehicle according to any one of the above [B1] to [B9], further including:

a sound output device, in which the item of the vehicle is changing of a voltage of sound emitted from the sound output device.

[B11]

The vehicle according to any one of the above [B1] to [B9], further including:

a sound output device, in which the sound emitting can output an audio content, and in which the item of the vehicle is fast forwarding and/or fast rewinding of the audio content.

[B12]

The vehicle according to any one of the above [B1] to [B11], in which, in a case where at least a first backrest of the first seat and a second backrest of the second seat are disposed to face each other, first input on the first touchscreen in a predetermined orientation along the advancing direction and second input on the second touchscreen in the predetermined orientation along the advancing direction have the same meaning.

[B13]

The vehicle according to any one of the above [B1] to [B11], in which, in a case where at least a first backrest of the first seat and a second backrest of the second seat are disposed to face each other, third input on the first touchscreen in a first orientation along the advancing direction and fourth input on the second touchscreen in a second orientation opposite to the first orientation along the advancing direction have the same meaning.

[B14]

The vehicle according to any one of the above [B1] to [B13], in which, in a case where at least a first backrest of the first seat and a second backrest of the second seat are disposed to face each other, fifth input on the first touchscreen in a predetermined orientation along a rotation axis direction of the wheel and sixth input on the second touchscreen in the predetermined orientation along the rotation axis direction of the wheel have the same meaning.

[B15]

The vehicle according to any one of the above [B1] to [B13], in which, in a case where at least a first backrest of the first seat and a second backrest of the second seat are disposed to face each other, seventh input on the first touchscreen in a third orientation along a rotation axis direction of the wheel and eighth input on the second touchscreen in a fourth orientation along the rotation axis direction of the wheel have the same meaning.

[B16]

The vehicle according to any one of the above [B1] to [B15], in which, in a case where at least a first backrest of the first seat and a second backrest of the second seat are disposed to face each other, clockwise ninth input on the first touchscreen and clockwise tenth input on the second touchscreen have the same meaning.

[C1]

A vehicle including:

at least one rotatable wheel;

a seat on which an occupant can be seated;

an armrest that is disposed along an advancing direction of the wheel in at least a part of the periphery of the seat and on which at least a part of the arm of the occupant can be placed;

a touchscreen that is disposed inside the armrest; and a cover that is disposed to overlap the touchscreen and covers at least a part of the armrest, in which the seat is rotatable about a rotation shaft along a direction perpendicular to a plane formed by an advancing direction of the wheel and a rotation axis direction of the wheel, in which the armrest is not moved with rotation of the seat, and in which the touchscreen is disposed at a position away from a position of the rotation shaft of the seat in the advancing direction in the armrest.

[C2]

The vehicle according to the above [C1], in which the touchscreen includes a first touchscreen and a second touchscreen, and in which the first touchscreen and the second touchscreen are disposed at positions away from the position of the rotation shaft of the seat in the advancing direction in the armrest.

[C3]

The vehicle according to the above [C2], in which the second touchscreen is disposed at a position opposite to the first touchscreen in the advancing direction with respect to the position of the rotation shaft of the seat in the armrest.

[C4]

The vehicle according to the above [C3], in which, with respect to rotation of the seat, the first touchscreen can be used in a first state, and the second touchscreen can be used in a second state.

[C5]

The vehicle according to the above [C4], in which the seat has a seat surface and a backrest, in which, in a case of the first state, the backrest of the seat is directed in a first orientation in the advancing direction, and in which, in a case of the second state, the backrest of the seat is directed in a second orientation different from the first orientation in the advancing direction.

[C6]

The vehicle according to the above [C5], in which the first orientation and the second orientation are different from each other by any angle between 90 degrees and 180 degrees.

[C7]

The vehicle according to the above [C6], in which the first orientation and the second orientation are different from each other by 180 degrees.

[C8]

The vehicle according to any one of the above [C5] to [C7], in which the seat surface of the seat and the backrest of the seat can be fixed.

[C9]

The vehicle according to any one of the above [C1] to [C8], further including:

a support column that supports the seat and through which the rotation shaft of the seat passes.

[C10]

The vehicle according to any one of the above [C1] to [C9], in which the armrest is fixed to the vehicle.

[C11]

The vehicle according to any one of the above [C1] to [C10], further including:

a floor that is disposed along the plane formed by the advancing direction of the wheel and the rotation axis direction of the wheel, in which a space between at least a part of the armrest and the floor is hollow.

[C12]
The vehicle according to any one of the above [C1] to [C11],
in which the occupant is a first occupant,
in which the seat is a first seat,
in which the vehicle further includes a second seat on which a second occupant can be seated,
in which the first seat and the second seat are disposed along the rotation axis direction of the wheel, and
in which the armrest is disposed between the first seat and the second seat.

[D1]
A vehicle including:
at least one rotatable wheel;
at least one seat on which an occupant can be seated;
an armrest that is disposed along an advancing direction of the wheel in at least a part of the periphery of the seat and on which at least a part of the arm of the occupant can be placed;
a light emitting device that is disposed inside the armrest and can emit predetermined light;
a touchscreen that is disposed to overlap the light emitting device in the armrest; and
a cover that is disposed to overlap the light emitting device and the touchscreen, has a predetermined transmittance for the predetermined light, and covers at least a part of the armrest,
in which the touchscreen can detect a position of the occupant's finger along a predetermined plane formed by an advancing direction of the wheel and the rotation axis direction of the wheel, and
in which the cover covers the entire surfaces of the light emitting device and the touchscreen, and covers at least 50% of an upper surface of the armrest.

[D2]
The vehicle according to the above [D1],
in which the cover covers at least 80% of the upper surface of the armrest.

[D3]
The vehicle according to the above [D1] or [D2],
in which the cover has a pattern, and
in which the cover covers the light emitting device, the touchscreen, and the armrest such that the pattern is continued.

[D4]
The vehicle according to any one of the above [D1] to [D3],
in which the cover has a pattern, and
in which the vehicle further includes a panel that is disposed along the rotation axis direction of the wheel in at least a part of the periphery of the seat, and
in which the cover covers the light emitting device, the touchscreen, the armrest, and the panel such that the pattern is continued.

[D5]
The vehicle according to the above [D4],
in which the armrest is a first armrest,
in which the vehicle further includes a second armrest that is along the advancing direction of the wheel and on which at least a part of the occupant's arm can be placed, at a position opposite to the first armrest with respect to the seat, and
in which the cover covers the light emitting device, the touchscreen, the first armrest, the panel, and the second armrest such that the pattern is continued.

[D6]
The vehicle according to any one of the above [D3] to [D5],
in which the pattern is a woodgrain.

[D7]
The vehicle according to any one of the above [D1] to [D6],
in which the light emitting device is a display circuit.

[D8]
The vehicle according to the above [D7],
in which the display circuit has an LCD and a backlight.

[D9]
The vehicle according to the above [D7],
The display circuit is an organic EL display circuit.

[D10]
The vehicle according to any one of the above [D1] to [D9],
in which the touchscreen is disposed between the light emitting device and the cover.

Although the embodiments of the vehicle according to the present disclosure have been described with reference to the drawings, the present disclosure is not limited to the examples. It is obvious to those skilled in the art that various alterations, modifications, substitutions, additions, deletions and equivalents are conceivable within the scope of the claims, and it is naturally understood that they belong to the technical scope of the present disclosure. The respective constituents in the above embodiments may be arbitrarily combined in the scope without departing from the spirit of the invention.

The present application is based on the Japanese patent application filed on Jan. 5, 2018 (Japanese Patent Application No. 2018-000533), the Japanese patent application filed on Oct. 2, 2018 (Japanese Patent Application No. 2018-187657), the Japanese patent application filed on Oct. 2, 2018 (Japanese Patent Application No. 2018-187658), and the Japanese patent application filed on Oct. 2, 2018 (Japanese Patent Application No. 2018-187659), the contents of which are incorporated by reference in the present application.

The vehicle of the present disclosure enables seated occupants to respectively operate touchscreens in a state in which the occupants face each other, and is thus useful in a field requiring a living mode during automated traveling.

The invention claimed is:
1. A vehicle comprising:
a vehicle body that comprises a vehicle cabin;
at least one wheel that is disposed along one direction in the vehicle body;
a seat that is disposed inside the vehicle cabin;
a first planar member that is fixed to the vehicle body, separates the vehicle cabin from an outside of the vehicle, is disposed further toward the outside of the vehicle than the seat in the one direction, and has a first transmittance for visible light;
a second planar member that is allowed to be disposed between the first planar member and the seat, and has a second transmittance for visible light that is smaller than the first transmittance; and
an input device,
wherein the second planar member is disposed between the first planar member and the seat in a case where an input is performed on the input device,
wherein the vehicle cabin comprises an in-vehicle lighting that illuminates at least a seat surface of the seat,
wherein in a case where the input is performed on the input device, the second planar member is brought into a state in which the second planar member is disposed between the first planar member and the seat, wherein in a case where the second planar member is in the state, the in-vehicle lighting sets an illuminance on the seat surface of the seat to a first illuminance, and wherein, in a case where the second planar member is not in the state, the in-vehicle lighting sets the illuminance on the seat surface of the seat to a second illuminance lower than the first illuminance.

2. The vehicle according to claim 1,
wherein the vehicle body comprises at least one lighting, and
wherein the at least one lighting comprises a first lighting that applies light in the one direction.

3. The vehicle according to claim 2,
wherein the at least one lighting is a plurality of lightings comprising the first lighting, and
wherein the first lighting is configured to apply light stronger than light of others of the plurality of lightings.

4. The vehicle according to claim 1, further comprising:
a movement mechanism that moves the second planar member,
wherein in a case where the input is performed on the input device, the second planar member is disposed between the first planar member and the seat by the movement mechanism.

5. The vehicle according to claim 4, further comprising:
a storage configured to store the second planar member,
wherein in a case where the input is performed on the input device, at least a part of the second planar member is exposed from the storage.

6. The vehicle according to claim 1, further comprising:
a controller,
wherein, in a case where the input is performed on the input device, the controller performs control such that the second planar member is disposed between the first planar member and the seat.

7. The vehicle according to claim 1,
wherein the input device is configured to receive an input from an occupant of the vehicle.

8. The vehicle according to claim 7,
wherein the input device comprises an operation device, and
wherein the operation device is configured to receive an operation from the occupant.

9. The vehicle according to claim 7,
wherein the seat comprises a rotation shaft, and
wherein in a case where the seat is rotated about the rotation shaft by an angle, the second planar member is disposed between the first planar member and the seat.

10. The vehicle according to claim 9,
wherein the vehicle cabin comprises a floor surface, and
wherein the rotation shaft of the seat extends in a direction perpendicular to the floor surface.

11. The vehicle according to claim 1,
wherein the seat is a first seat,
wherein the vehicle further comprises a third seat, and
wherein the first seat and the third seat are disposed along a direction perpendicular to the one direction.

12. The vehicle according to claim 11,
wherein at least a part of the second planar member is allowed to be disposed between the first seat and the third seat.

13. The vehicle according to claim 12,
wherein at least a part of the second planar member comprises a curved surface.

14. The vehicle according to claim 1,
wherein the vehicle is configured to perform autonomous traveling.

15. A vehicle comprising:
a vehicle body that comprises a vehicle cabin;
at least one wheel that is disposed along one direction in the vehicle body;
a seat that is disposed inside the vehicle cabin;
a first planar member that is fixed to the vehicle body, separates the vehicle cabin from an outside of the vehicle, is disposed further toward the outside of the vehicle than the seat in the one direction, and has a first transmittance for visible light;
a second planar member that is allowed to be disposed between the first planar member and the seat, and has a second transmittance for visible light that is smaller than the first transmittance; and
an input device,
wherein the second planar member is disposed between the first planar member and the seat in a case where an input is performed on the input device,
wherein the seat is a first seat,
wherein the vehicle further comprises a second seat,
wherein the second seat and the first seat are disposed along the one direction,
wherein a backrest of the first seat and a backrest of the second seat are allowed to face each other,
wherein the backrest of the first seat and the backrest of the second seat are allowed to be directed in a same direction, and
wherein in at least a case where the backrest of the first seat and the backrest of the second seat are in a facing state, the backrest of the first seat is disposed to overlap the second planar member in a direction perpendicular to a floor surface of the vehicle cabin.

16. The vehicle according to claim 15,
wherein in at least a case where the backrest of the first seat and the backrest of the second seat are in the facing state, a movable range of the backrest of the first seat is restricted.

17. The vehicle according to claim 15,
wherein in at least a case where the backrest of the first seat and the backrest of the second seat are in the facing state, at least a part of the second planar member is stored in a storage configured to store the second planar member.

18. The vehicle according to claim 15,
wherein a movable range of the backrest of the first seat is restricted while the first seat and the second seat transition between the facing state and a state of being directed in the same direction.

19. The vehicle according to claim 15,
wherein in a case where the first seat and the second seat are in the facing state, the second planar member is controlled not to be disposed between the first planar member and the first seat.

20. The vehicle according to claim 15,
wherein the vehicle is configured to perform autonomous traveling.

21. A vehicle comprising:
a vehicle body that comprises a vehicle cabin;
at least one wheel that is disposed along one direction in the vehicle body;
a seat that is disposed inside the vehicle cabin;
a first planar member that is fixed to the vehicle body, separates the vehicle cabin from an outside of the vehicle, is disposed further toward the outside of the vehicle than the seat in the one direction, and has a first transmittance for visible light;

a second planar member that is allowed to be disposed between the first planar member and the seat, and has a second transmittance for visible light that is smaller than the first transmittance; and an input device, wherein the second planar member is disposed between the first planar member and the seat in a case where an input is performed on the input device, wherein the first transmittance of the first planar member is variable in two or more steps, and wherein in a case where the second planar member is disposed between the first planar member and the seat, the first transmittance of the first planar member is controlled to be reduced.

22. The vehicle according to claim 21, further comprising:
a display device that is provided on a surface of the second planar member on a seat side.

23. The vehicle according to claim 22,
wherein the display device has rectangular shape, and
wherein a long side direction of the rectangular shape extends along a direction perpendicular to the one direction.

24. The vehicle according to claim 22,
wherein the display device is configured to display an image.

25. The vehicle according to claim 21,
wherein the vehicle is configured to perform autonomous traveling.

* * * * *